US011587067B2

United States Patent
Aabye et al.

(10) Patent No.: US 11,587,067 B2
(45) Date of Patent: Feb. 21, 2023

(54) DIGITAL WALLET SYSTEM AND METHOD

(71) Applicant: Visa International Service Association, San Francisco, CA (US)

(72) Inventors: Christian Aabye, Redwood City, CA (US); Kevin Weller, San Anselmo, CA (US)

(73) Assignee: Visa International Service Association, San Francisco, CA (US)

( * ) Notice: Subject to any disclaimer, the term of this patent is extended or adjusted under 35 U.S.C. 154(b) by 197 days.

(21) Appl. No.: 16/443,460

(22) Filed: Jun. 17, 2019

(65) Prior Publication Data

US 2019/0303919 A1    Oct. 3, 2019

Related U.S. Application Data

(62) Division of application No. 14/526,306, filed on Oct. 28, 2014, now Pat. No. 10,366,387.

(Continued)

(51) Int. Cl.
| | |
|---|---|
| G06Q 20/36 | (2012.01) |
| G06Q 20/40 | (2012.01) |
| G06Q 20/32 | (2012.01) |

(52) U.S. Cl.
CPC .......... *G06Q 20/36* (2013.01); *G06Q 20/322* (2013.01); *G06Q 20/40* (2013.01)

(58) Field of Classification Search
CPC ...... G06Q 20/20; G06Q 20/322; G06Q 20/40; G06Q 20/3674; G06Q 20/327; G06Q 20/36; H04L 67/10

(Continued)

(56) References Cited

U.S. PATENT DOCUMENTS

| | | |
|---|---|---|
| 5,280,527 A | 1/1994 | Gullman et al. |
| 5,930,767 A | 7/1999 | Reber et al. |

(Continued)

FOREIGN PATENT DOCUMENTS

| | | |
|---|---|---|
| EP | 1028401 | 8/2000 |
| WO | 0014648 | 3/2000 |

(Continued)

OTHER PUBLICATIONS

U.S. Appl. No. 14/526,306, "Final Office Action", dated Oct. 16, 2018, 11 pages.

(Continued)

*Primary Examiner* — Ariel J Yu
*Assistant Examiner* — Denisse Y Ortiz Roman
(74) *Attorney, Agent, or Firm* — Kilpatrick Townsend & Stockton LLP

(57) ABSTRACT

Embodiments of the present invention provide methods and systems to enable a digital wallet identifier to be present in communications associated with transaction data for transactions that are facilitated by a digital wallet provider. In one embodiment, a communication device of a user receives a request for payment credentials required to conduct a transaction and obtains the payment credentials. The payment credentials include a digital wallet identifier and at least some of the payment credentials are obtained from a trusted execution environment associated with the communication device. The obtained payment credentials are provided to an access device associated with a merchant. The access device is configured to initiate the transaction by generating an authorization request message including the payment credentials for onward transmission to an issuer computer.

17 Claims, 8 Drawing Sheets

Related U.S. Application Data

(60) Provisional application No. 61/896,895, filed on Oct. 29, 2013.

(58) Field of Classification Search
USPC .......................... 705/16, 41, 18, 42
See application file for complete search history.

(56) References Cited

U.S. PATENT DOCUMENTS

| | | | |
|---|---|---|---|
| 6,453,301 | B1 | 9/2002 | Niwa |
| 7,209,561 | B1 | 4/2007 | Shankar et al. |
| 7,818,264 | B2 | 10/2010 | Hammad |
| 7,848,980 | B2 | 12/2010 | Carlson |
| 7,908,216 | B1 | 3/2011 | Davis et al. |
| 8,219,489 | B2 | 7/2012 | Patterson |
| 8,229,852 | B2 | 7/2012 | Carlson |
| 8,281,991 | B2 * | 10/2012 | Wentker ............. G06Q 20/40 235/382 |
| 8,336,088 | B2 | 12/2012 | Raj et al. |
| 8,346,666 | B2 | 1/2013 | Lindelsee et al. |
| 8,504,475 | B2 | 8/2013 | Brand et al. |
| 8,528,067 | B2 | 9/2013 | Hurry et al. |
| 8,577,813 | B2 | 11/2013 | Weiss |
| 8,655,719 | B1 * | 2/2014 | Li ....................... G06Q 30/0631 705/14.1 |
| 8,762,263 | B2 | 6/2014 | Gauthier et al. |
| 8,838,982 | B2 | 9/2014 | Carlson et al. |
| 8,856,539 | B2 | 10/2014 | Weiss |
| 8,942,548 | B2 * | 1/2015 | Soroushian ............ H04L 67/10 386/343 |
| 9,065,643 | B2 | 6/2015 | Hurry et al. |
| 9,070,129 | B2 | 6/2015 | Sheets et al. |
| 9,100,826 | B2 | 8/2015 | Weiss |
| 9,160,741 | B2 | 10/2015 | Wentker et al. |
| 9,229,964 | B2 | 1/2016 | Stevelinck |
| 9,245,267 | B2 | 1/2016 | Singh |
| 9,249,241 | B2 | 2/2016 | Dai et al. |
| 9,256,871 | B2 | 2/2016 | Anderson et al. |
| 9,280,765 | B2 | 3/2016 | Hammad |
| 9,530,137 | B2 | 12/2016 | Weiss |
| 9,680,942 | B2 | 6/2017 | Dimmick |
| 9,741,051 | B2 | 8/2017 | Carpenter et al. |
| 10,657,521 | B2 * | 5/2020 | Tomasofsky ......... G06Q 20/409 |
| 2004/0236632 | A1 | 11/2004 | Maritzen et al. |
| 2009/0281948 | A1 | 11/2009 | Carlson |
| 2010/0299267 | A1 | 11/2010 | Faith et al. |
| 2011/0047076 | A1 | 2/2011 | Carlson et al. |
| 2011/0153498 | A1 | 6/2011 | Makhotin et al. |
| 2011/0178926 | A1 | 7/2011 | Lindelsee et al. |
| 2011/0258111 | A1 | 10/2011 | Raj et al. |
| 2012/0030047 | A1 | 2/2012 | Fuentes et al. |
| 2012/0221421 | A1 | 8/2012 | Hammad |
| 2012/0226582 | A1 | 9/2012 | Hammad |
| 2012/0246079 | A1 | 9/2012 | Wilson et al. |
| 2013/0018757 | A1 | 1/2013 | Anderson et al. |
| 2013/0031006 | A1 | 1/2013 | McCullagh et al. |
| 2013/0036048 | A1 * | 2/2013 | Campos ............. G06Q 20/36 705/41 |
| 2013/0110658 | A1 * | 5/2013 | Lyman ............. G06Q 20/327 705/18 |
| 2013/0159184 | A1 | 6/2013 | Thaw |
| 2013/0198080 | A1 | 8/2013 | Anderson et al. |
| 2013/0212026 | A1 | 8/2013 | Powell et al. |
| 2013/0218769 | A1 | 8/2013 | Pourfallah et al. |
| 2013/0226799 | A1 | 8/2013 | Raj |
| 2013/0246199 | A1 | 9/2013 | Carlson |
| 2013/0246261 | A1 | 9/2013 | Purves et al. |
| 2013/0268437 | A1 * | 10/2013 | Desai ............. G06Q 20/08 705/41 |
| 2013/0297501 | A1 | 11/2013 | Monk et al. |
| 2013/0317928 | A1 | 11/2013 | Laracey |
| 2014/0013452 | A1 | 1/2014 | Aissi et al. |
| 2014/0019352 | A1 | 1/2014 | Shrivastava |
| 2014/0047551 | A1 | 2/2014 | Nagasundaram et al. |
| 2014/0068706 | A1 | 3/2014 | Aissi |
| 2014/0074637 | A1 | 3/2014 | Hammad |
| 2014/0108172 | A1 | 4/2014 | Weber et al. |
| 2014/0114857 | A1 | 4/2014 | Griggs et al. |
| 2014/0143137 | A1 | 5/2014 | Carlson |
| 2014/0164243 | A1 | 6/2014 | Aabye et al. |
| 2014/0188586 | A1 | 7/2014 | Carpenter et al. |
| 2014/0249945 | A1 | 9/2014 | Gauthier et al. |
| 2014/0294701 | A1 | 10/2014 | Dai et al. |
| 2014/0310183 | A1 | 10/2014 | Weber |
| 2014/0330721 | A1 * | 11/2014 | Wang ................... G06Q 20/40 705/44 |
| 2014/0330722 | A1 | 11/2014 | Laxminarayanan et al. |
| 2014/0331265 | A1 | 11/2014 | Mozell et al. |
| 2014/0337236 | A1 | 11/2014 | Wong et al. |
| 2014/0344153 | A1 | 11/2014 | Raj et al. |
| 2014/0365363 | A1 * | 12/2014 | Knudsen ............ G06Q 20/3674 705/41 |
| 2014/0372308 | A1 | 12/2014 | Sheets |
| 2015/0019443 | A1 | 1/2015 | Sheets et al. |
| 2015/0046339 | A1 | 2/2015 | Wong et al. |
| 2015/0052064 | A1 | 2/2015 | Karpenko et al. |
| 2015/0088756 | A1 | 3/2015 | Makhotin et al. |
| 2015/0106239 | A1 | 4/2015 | Gaddam et al. |
| 2015/0112870 | A1 | 4/2015 | Nagasundaram et al. |
| 2015/0112871 | A1 | 4/2015 | Kumnick |
| 2015/0120472 | A1 | 4/2015 | Aabye et al. |
| 2015/0127529 | A1 | 5/2015 | Makhotin et al. |
| 2015/0127547 | A1 | 5/2015 | Powell et al. |
| 2015/0140960 | A1 | 5/2015 | Powell et al. |
| 2015/0142673 | A1 | 5/2015 | Nelsen et al. |
| 2015/0161597 | A1 | 6/2015 | Subramanian et al. |
| 2015/0178724 | A1 | 6/2015 | Ngo et al. |
| 2015/0180836 | A1 | 6/2015 | Wong et al. |
| 2015/0186864 | A1 | 7/2015 | Jones et al. |
| 2015/0193222 | A1 | 7/2015 | Pirzadeh et al. |
| 2015/0195133 | A1 | 7/2015 | Sheets et al. |
| 2015/0199679 | A1 | 7/2015 | Palanisamy et al. |
| 2015/0199689 | A1 | 7/2015 | Kumnick et al. |
| 2015/0220917 | A1 | 8/2015 | Aabye et al. |
| 2015/0269566 | A1 | 9/2015 | Gaddam et al. |
| 2015/0278799 | A1 | 10/2015 | Palanisamy |
| 2015/0287037 | A1 | 10/2015 | Salmon et al. |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0356560 | A1 | 12/2015 | Shastry et al. |
| 2015/0363781 | A1 | 12/2015 | Badenhorst |
| 2016/0028550 | A1 | 1/2016 | Gaddam et al. |
| 2016/0036790 | A1 | 2/2016 | Shastry et al. |
| 2016/0042263 | A1 | 2/2016 | Gaddam et al. |
| 2016/0065370 | A1 | 3/2016 | Le Saint et al. |
| 2016/0092696 | A1 | 3/2016 | Guglani et al. |
| 2016/0092872 | A1 | 3/2016 | Prakash et al. |
| 2016/0092874 | A1 | 3/2016 | O'Regan et al. |
| 2016/0103675 | A1 | 4/2016 | Aabye et al. |
| 2016/0119296 | A1 | 4/2016 | Laxminarayanan et al. |
| 2016/0132878 | A1 | 5/2016 | O'Regan et al. |
| 2016/0140545 | A1 | 5/2016 | Flurscheim et al. |
| 2016/0148197 | A1 | 5/2016 | Dimmick |
| 2016/0148212 | A1 | 5/2016 | Dimmick |
| 2016/0171479 | A1 | 6/2016 | Prakash et al. |
| 2016/0173483 | A1 | 6/2016 | Wong et al. |
| 2016/0197725 | A1 | 7/2016 | Hammad |
| 2016/0210617 | A1 * | 7/2016 | Leger ................ G06Q 20/367 |
| 2016/0210628 | A1 | 7/2016 | McGuire |
| 2016/0218875 | A1 | 7/2016 | Le Saint et al. |
| 2016/0269391 | A1 | 9/2016 | Gaddam et al. |
| 2016/0308995 | A1 | 10/2016 | Youdale et al. |
| 2017/0109745 | A1 | 4/2017 | Al-Bedaiwi et al. |
| 2017/0186001 | A1 | 6/2017 | Reed et al. |
| 2017/0201520 | A1 | 7/2017 | Chandoor et al. |
| 2017/0295155 | A1 | 10/2017 | Wong |

(56) References Cited

U.S. PATENT DOCUMENTS

2017/0364903 A1 12/2017 Lopez
2018/0075081 A1 3/2018 Chipman

FOREIGN PATENT DOCUMENTS

WO 2004051585 6/2004
WO 2005001751 1/2005

OTHER PUBLICATIONS

U.S. Appl. No. 14/526,306 , "Final Office Action", dated Nov. 6, 2017, 18 pages.
U.S. Appl. No. 14/526,306 , "Non Final Office Action", dated May 10, 2018, 9 pages.
U.S. Appl. No. 14/526,306 , "Non-Final Office Action", dated Jul. 17, 2017, 12 pages.
U.S. Appl. No. 14/526,306 , "Notice of Allowance", dated Mar. 25, 2019, 7 pages.
U.S. Appl. No. 14/526,306 , "Restriction Requirement", dated Mar. 30, 2017, 7 pages.
"U.S. Appl. No. 15/011,366", Token Check Offline, filed Jan. 29, 2016, 60 pages.
"U.S. Appl. No. 15/019,157", Token Processing Utilizing Multiple Authorizations, filed Feb. 9, 2016, 62 pages.
"U.S. Appl. No. 15/041,495", Peer Forward Authorization of Digital Requests, filed Feb. 11, 2016, 63 pages.
"U.S. Appl. No. 15/585,077", System and Method Using Interaction Token, filed May 2, 2017, 36 pages.
"U.S. Appl. No. 15/956,991", Mobile Tokenization Hub, filed Apr. 19, 2018, 118 pages.
"U.S. Appl. No. 15/977,921", Integration of Verification Tokens With Mobile Communication Devices, filed May 11, 2018, 112 pages.
"U.S. Appl. No. 61/738,832", Management of Sensitive Data, filed Dec. 18, 2012, 22 pages.
"U.S. Appl. No. 61/751,763", Payments Bridge, filed Jan. 11, 2013, 64 pages.
"U.S. Appl. No. 61/879,632", Systems and Methods for Managing Mobile Cardholder Verification Methods, filed Sep. 18, 2013, 55 pages.
"U.S. Appl. No. 61/892,407", Issuer Over-the-Air Update Method and System, filed Oct. 17, 2013, 28 pages.
"U.S. Appl. No. 61/894,749", Methods and Systems for Authentication and Issuance of Tokens in a Secure Environment, filed Oct. 23, 2013, 67 pages.
"U.S. Appl. No. 61/926,236", Methods and Systems for Provisioning Mobile Devices With Payment Credentials and Payment Token Identifiers, filed Jan. 10, 2014, 51 pages.
"U.S. Appl. No. 62/000,288", Payment System Canonical Address Format, filed May 19, 2014, 58 pages.
"U.S. Appl. No. 62/003,717", Mobile Merchant Application, filed May 28, 2014, 58 pages.
"U.S. Appl. No. 62/024,426", Secure Transactions Using Mobile Devices, filed Jul. 14, 2014, 102 pages.
"U.S. Appl. No. 62/037,033", Sharing Payment Token, filed Aug. 13, 2014, 36 pages.
"U.S. Appl. No. 62/038,174", Customized Payment Gateway, filed Aug. 15, 2014, 42 pages.
"U.S. Appl. No. 62/042,050", Payment Device Authentication and Authorization System, filed Aug. 26, 2014, 120 pages.
"U.S. Appl. No. 62/053,736", Completing Transactions Without a User Payment Device, filed Sep. 22, 2014, 31 pages.
"U.S. Appl. No. 62/054,346", Mirrored Token Vault, filed Sep. 23, 2014, 38 pages.
"U.S. Appl. No. 62/103,522", Methods and Systems for Wallet Provider Provisioning, filed Jan. 14, 2015, 39 pages.
"U.S. Appl. No. 62/108,403", Wearables With NFC HCE, filed Jan. 27, 2015, 32 pages.
"U.S. Appl. No. 62/117,291", Token and Cryptogram Using Transaction Specific Information, filed Feb. 17, 2015, 25 pages.
"U.S. Appl. No. 62/128,709", Tokenizing Transaction Amounts, filed Mar. 5, 2015, 30 pages.

\* cited by examiner

DIGITAL WALLET SYSTEM AND METHOD

CROSS-REFERENCE TO RELATED APPLICATIONS

The present application is a divisional of U.S. patent application Ser. No. 14/526,306, filed Oct. 28, 2014, which is a non-provisional application of and claims priority to U.S. Provisional Application No. 61/896,895, filed on Oct. 29, 2013, the entire contents of which are herein incorporated by reference for all purposes.

BACKGROUND

Embodiments of the present invention are directed to methods and systems that enable a digital wallet identifier to be present in communications associated with transaction data of transactions that are facilitated by a digital wallet provider.

Digital wallets are becoming increasingly popular for conducting various types of transactions. A digital wallet can store financial account information or other information associated with a user, for example, information associated with credit cards, debit cards, coupons, rewards, receipts, concert tickets, and the like. A digital wallet may be linked to a user's payment credentials as well as personal information. The wallet data may reside on a communication device such as a user's mobile device or a personal computer, on a server of a wallet provider or other cloud storage, and may be obtained by and transferred to a merchant from a user's communication device. This reduces the need to enter payment credentials or present a physical card each time a payment transaction is conducted.

Digital wallets may be associated with merchants, mobile network operators, financial institutions such as banks, or third party vendors. A transaction may be initiated from the communication device of a user using one of many digital wallets associated with the user's communication device. A problem associated with such transactions is that there may be no mechanism available to identify a digital wallet provider associated with the transaction by downstream entities in a typical transaction flow, for example, by a merchant or an acquirer associated with the merchant. As a result, these downstream entities may not be capable of obtaining sufficient data relating to transactions facilitated by digital wallet providers. For instance, a merchant and its associated acquirer may not be capable of readily ascertaining which digital wallet providers are favored by users when transacting at the particular merchant.

Further, in some digital wallet implementations, a transaction may be initiated by providing payment credentials in the form of a payment token instead of providing conventional account information such as a Primary Account Number (PAN), a card expiry date and a Card Verification Value (CVV) to a merchant. The payment token may be transmitted to a payment processing network capable of using the payment token to identify the account information and route the transaction to the appropriate issuing institution. This mechanism may reduce security risks, for example, in that a user's sensitive payment credentials may remain hidden from merchants.

In some cases, a user may, for example, generate payment tokens using more than one communication device. As a result, one payment account may be represented by a plurality of different payment tokens, and entities such as merchants and acquirers may not have sufficient information to identify the different tokens as being associated with a single payment account or user. Tracing these different tokens to a payment account or user may be desirable, for instance, to allocate benefits or rewards to a user regardless of whether the user employed different payment tokens to transact.

Embodiments of the invention aim to address these and other problems, individually and collectively.

BRIEF SUMMARY

Embodiments of the present invention are directed to methods and systems that enable a digital wallet identifier to be present in communications associated with transaction data of transactions that are facilitated by a digital wallet provider.

Embodiments of the invention are directed to a method comprising receiving, at a communication device of a user, a request for payment credentials required to conduct a transaction; obtaining, by the communication device, the payment credentials, the obtained payment credentials including a digital wallet identifier and at least some of the obtained payment credentials being obtained from a trusted execution environment associated with the communication device; and providing the obtained payment credentials to an access device associated with a merchant, wherein the access device is configured to initiate the transaction by generating an authorization request message including the payment credentials for onward transmission to an issuer computer.

In some embodiments, the communication device may be a mobile device and the access device may be a point of sale (POS) device configured to transmit the authorization request message to the issuer computer via an acquirer computer and a payment processing network. The digital wallet identifier may be a provider-specific digital wallet identifier which identifies a digital wallet provider associated with the transaction. The digital wallet identifier may further be a user-specific digital wallet identifier which identifier a digital wallet of the user.

In some embodiments, the obtained payment credentials may include both a provider-specific digital wallet identifier and a user-specific digital wallet identifier, the provider-specific digital wallet identifier identifying a digital wallet provider associated with the transaction and the user-specific digital wallet identifier identifying a digital wallet of the user. In some embodiments, a single identifier includes both the provider-specific digital wallet identifier and the user-specific digital wallet identifier.

The access device may be configured to format the authorization request message such that the digital wallet identifier is obtainable from the authorization request message by one or more of a merchant computer, an acquirer computer, a payment processing network and the issuer computer. In some embodiments, the authorization request message may be formatted so as to include two separate instances of the digital wallet identifier, a first instance of the digital wallet identifier being included in issuer application data for extraction by a payment processing network or the issuer computer, and a second instance of the digital wallet identifier being provided for extraction by a merchant computer or an acquirer computer. In some embodiments, the digital wallet identifier is obtainable from the authorization request message for inclusion in a clearing message.

In some embodiments, the digital wallet identifier may be used to determine benefits or fees associated with the transaction. An entity may identify that a transaction was conducted using a digital wallet and use it as a qualification criteria to apply different pricing, interchange fee rates and/or liability rules.

The method may include the steps of receiving, from a digital wallet provider, the digital wallet identifier, and storing the digital wallet identifier in the trusted execution environment. In some embodiments, the communication device is a mobile device and the trusted execution environment is provided by a secure element on the mobile device. Alternatively, the trusted execution environment may be provided by a cloud storage.

In some embodiments, the request for payment credentials may be received via input from a user to a digital wallet software application of the communication device indicating that a transaction is to be initiated. The payment credentials may include a payment token which is provided to the access device instead of a Primary Account Number (PAN), the payment token being substituted for a corresponding PAN at a payment processing network.

Embodiments of the invention are further directed to a communication device. The communication device may have a processor and a computer-readable non-transitory medium coupled to the processor, the computer-readable medium comprising code executable by the processor for implementing a method comprising receiving, at the communication device, a request for payment credentials required to conduct a transaction; obtaining, by the communication device, the payment credentials, the obtained payment credentials including a digital wallet identifier and at least some of the obtained payment credentials being obtained from a trusted execution environment associated with the communication device; and providing the obtained payment credentials to an access device associated with a merchant, wherein the access device is configured to initiate the transaction by generating an authorization request message including the payment credentials for onward transmission to an issuer computer.

Embodiments of the invention are still further directed to a system. The system may comprise a communication device having a processor and a computer-readable non-transitory medium coupled to the processor, the computer-readable medium comprising code executable by the processor for implementing a method comprising receiving, at the communication device, a request for payment credentials required to conduct a transaction; obtaining, by the communication device, the payment credentials, the obtained payment credentials including a digital wallet identifier and at least some of the obtained payment credentials being obtained from a trusted execution environment associated with the communication device; and providing the obtained payment credentials to an access device associated with a merchant, wherein the access device is configured to initiate the transaction by generating an authorization request message including the payment credentials for onward transmission to an issuer computer.

Embodiments of the invention are directed to a further method. The method may comprise receiving, at a payment processing network, a request for a digital wallet identifier, the request originating from a digital wallet provider; generating the digital wallet identifier; associating the digital wallet identifier with the digital wallet provider or a digital wallet of a user; and providing the digital wallet identifier to the digital wallet provider, wherein the digital wallet provider causes the digital wallet identifier to be obtainable by a communication device of the user, and wherein the communication device is configured to provide the digital wallet identifier to an access device associated with a merchant for generating an authorization request message including the digital wallet identifier. In other embodiments, a service/process could host multiple digital wallet solutions. In such embodiments, the service/process can obtain and pass a unique digital wallet ID for each of the different wallet solutions.

In some embodiments, the digital wallet provider may be a provider-specific digital wallet identifier which identifies the digital wallet provider, and the step of associating the digital wallet identifier with the digital wallet provider may include storing, in a digital wallet database, a record including the generated digital wallet identifier and the digital wallet provider it is associated with. In some embodiments, the digital wallet identifier may be a user-specific digital wallet identifier which identifies a digital wallet of a user, and the step of associating the digital wallet identifier with the generated digital wallet of the user may include storing, in a digital wallet database, a record including the digital wallet identifier and the digital wallet it is associated with. In some embodiments, the digital wallet identifier may identify both the digital wallet provider and the digital wallet of the user.

In order for the invention to be more fully understood, these and other embodiments of the invention will now be described in further detail below.

DETAILED DESCRIPTION

Figure 1:
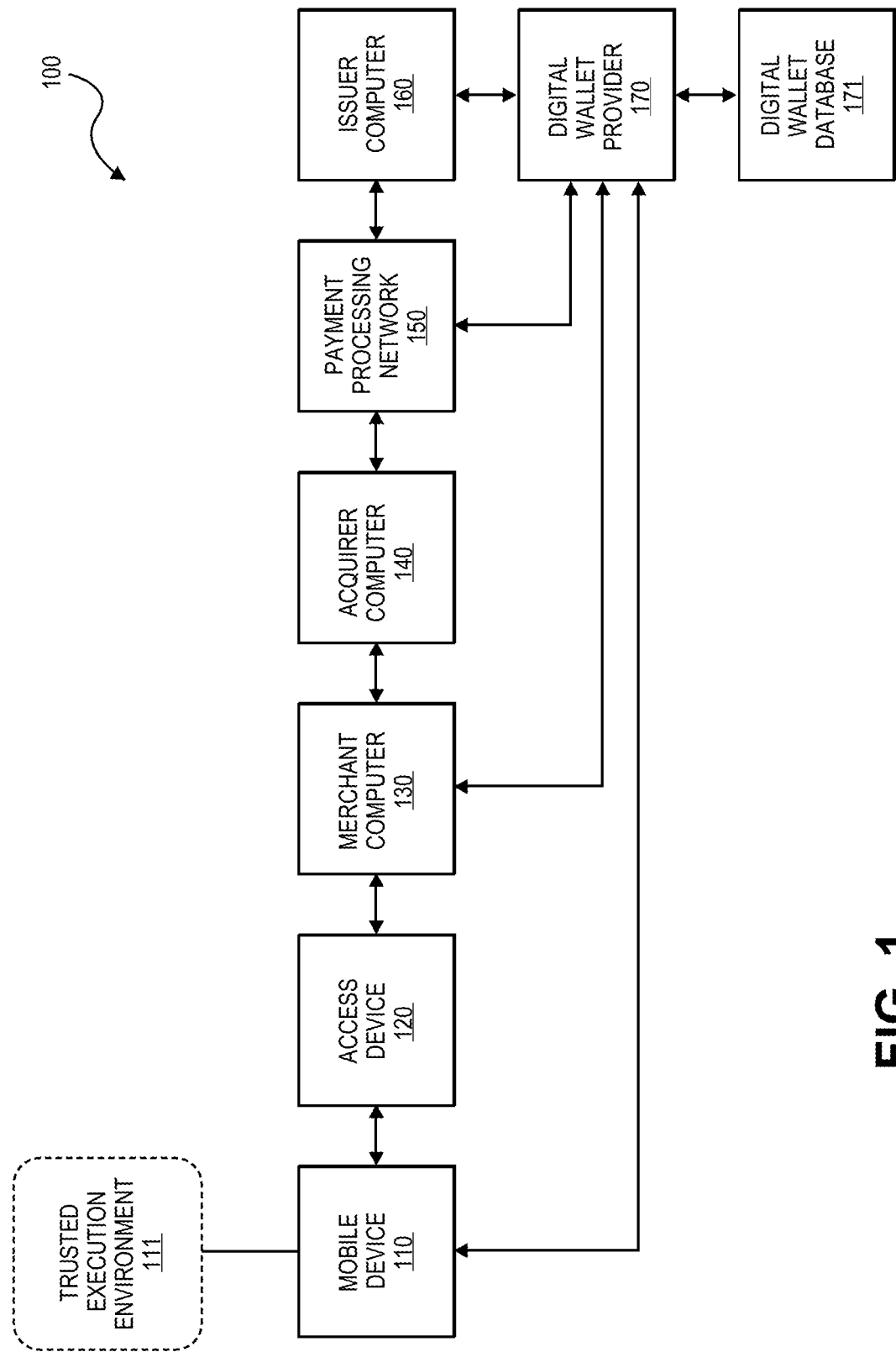
FIG. 1 illustrates a system wherein transactions facilitated by a digital wallet provider may be processed according to embodiments of the invention.

A digital wallet can be used by a user associated with the digital wallet to conduct financial transactions. Digital wallets may also be associated with authorization and completion transactions, including encryption of sensitive payment data and personal user data. A transaction may be initiated by a communication device, such as a mobile device or a personal computer, using one of many digital wallets associated with the communication device. However, there may be no mechanism available to identify a digital wallet provider associated with the transaction by downstream entities in a typical transaction flow. Further, in cases where one payment account or user may be associated with a plurality of different payment tokens which are provided to a merchant to initiate or complete a transaction, it may not be possible for some entities in an authorization network to establish that the different payment tokens are associated with a single payment account, digital wallet and/or user.

Embodiments of the invention provide methods and systems to enable a digital wallet identifier, which may identify one or both of a digital wallet provider (provider-specific digital wallet identifier) and a digital wallet of a user (user-specific digital wallet identifier), to be present in communications such as authorization and clearing messages associated with transaction data for transactions that are facilitated by a digital wallet provider. Embodiments provide the ability to identify that a transaction was conducted using a digital wallet and/or that a transaction was facilitated by a particular digital wallet provider. The digital wallet identifier may be used to determine benefits or fees associated with the transaction. For example, it may be used as a qualification criteria to apply different pricing, interchange fee rates and/or liability rules.

In some embodiments, a communication device of a user receives a request for payment credentials required to conduct a transaction and obtains the payment credentials, at least some of the payment credentials being obtained from a trusted execution environment associated with the communication device. The obtained payment credentials include a digital wallet identifier. The access device is configured to initiate the transaction by generating an authorization request message including the payment credentials for onward transmission to an issuer computer.

Embodiments further provide a mechanism for provisioning digital wallet identifiers to digital wallet providers. A payment processing network may receive a request for a digital wallet identifier from a digital wallet provider and generate the digital wallet identifier. The digital wallet identifier is then associated with the digital wallet provider, or with a particular digital wallet of a user, and provided to the digital wallet provider. The digital wallet provider may, in turn, cause the digital wallet identifier to be obtainable by a communication device of the user to enable the communication device to provide the digital wallet identifier to an access device associated with a merchant for generating an authorization request message including the digital wallet identifier. As a result, the digital wallet identifier may be present in communications relating to transaction data, and the digital wallet provider facilitating a transaction and/or the specific user's digital wallet may be identified by entities receiving and transmitting these communications.

Embodiments of the invention provide a number of technical advantages. A digital wallet identifier may be assigned to a digital wallet provider. The digital wallet provider may load the digital wallet identifier into a trusted execution environment associated with a communication device of a user, along with other payment credentials. When the user transacts using the digital wallet, the communication device may communicate the digital wallet identifier along with the other payment credentials to a merchant. This may enable one or more of the merchant, an acquirer, a payment processing network, and an issuer to extract the digital wallet identifier from transaction data and use it for a variety of purposes, examples of which are briefly set out below.

For example, one of these entities may identify a transaction as being facilitated by a digital wallet provider once a digital wallet identifier is received, and use the data to support consumer loyalty programs, discounts, offers, and other types of marketing programs associated with the use of a particular digital wallet. The marketing programs may run between the digital wallet provider and the merchant, issuer, a manufacturer, acquirer, the user, or any other suitable party. Further, one or more of these entities may wish to identify transactions as conducted with a digital wallet or as facilitated by a particular digital wallet provider for fraud analysis or risk management purposes, to improve chargeback and dispute management, to distinguish digital wallet transactions from other transaction types, for improved user support, for assigning different fees and rates based on the digital wallet or digital wallet provider in question, for enhancing or reducing security measures associated with a transaction, for whitelisting or blacklisting users or digital wallet providers, for data mining purposes, etc.

Further, the digital wallet identifier may serve to identify a specific digital wallet of a user. A user may, for example, generate payment tokens using more than one communication device. As a result, one payment account may be represented by a plurality of different payment tokens. A user-specific digital wallet identifier may be included in transaction data originating from the digital wallet, the digital wallet identifier being the same regardless of the payment token used, such that these different tokens may be traced to the user or the digital wallet used. This may allow for assigning benefits or different rates based on the user or the digital wallet used, for whitelisting or blacklisting, to obtain data required for loyalty programs, to perform data mining, etc.

These and other embodiments and examples are discussed in greater detail with reference to specific examples below. However, prior to discussing exemplary embodiments of the invention, description of some terms may be helpful in understanding embodiments of the invention.

A "trusted execution environment" may be a secure environment on a communication device, for example, a mobile device or personal computer, or a cloud storage for securely storing data. A trusted execution environment may be supported in software, hardware, firmware or a combination thereof. The trusted execution environment may be implemented so that its execution and data space are isolated from other environments executing code on a computing device, a mobile device or the cloud. For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using one or more trusted execution environments that may include a secure element, SIM/UICC card, or virtualization technology. An exemplary implementation of the trusted execution environment may be a secure element provided on a mobile device.

A "secure element" may include any secure memory device such that the data contained on the secure element cannot easily be hacked, cracked, or obtained by an unauthorized entity. For example, the secure element may be an integrated circuit device that is implemented within a near field communications (NFC) enabled mobile device. The secure element may contain embedded smart card-grade applications (e.g., payment, transport, etc.). The secure element may be used by the mobile device to host and store data and applications that require a high degree of security. For example, data stored on the secure element may be encrypted and may store payment account information, such as account numbers and credentials found in a digital wallet application or mobile payment application. The secure element may be provided to the mobile device by the secure element owner, who may also be the mobile network operator (MNO), original equipment manufacturer (OEM), mobile device manufacturer (MDM), digital wallet provider, or any other suitable entity. Additionally, the secure element may be either embedded in the handset of the mobile communication device or in a subscriber identity module (SIM) card that may be removable from the mobile communication device. The secure element can also be included in an add-on device such as a micro-Secure Digital (microSD) card or the like.

An "application" may be computer code or other data stored on a computer readable medium (e.g. memory element or secure element) that may be executable by a processor to complete a task. An "applet" can be a simplified application that may be programmed to perform a single or limited specific number of tasks, or which may run within the scope of a larger program or application.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In the examples provided herein, an access device and merchant computer may be referred to as separate system components. It should be appreciated, however, that the access device and merchant computer may be a single component, for example, one merchant communication device or POS device.

A "digital wallet" can store user profile information, payment information, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may refer to any entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or POS device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions. In some implementations, a user's issuing bank may be the digital wallet provider. Alternatively, the digital wallet provider may be a third party entity.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may include at least one payment token. A payment token may be substituted for a PAN (Primary Account Number), typically at a payment processing network. Tokens may be used in lieu of the PAN and may be used to generate originals and subsequent transactions for the entire transaction lifecycle. Certified tokens may be issued by a payment processing network or by using a process approved by a payment processing network. A certified token may link to a PAN. A non-certified token may be any token that was not generated by a payment processing network or was not generated using a process approved by a payment processing network. A non-certified token may link to a PAN or a card-on-file. Payment credentials may also include at least one digital wallet identifier.

A "digital wallet identifier" may be any suitable identifier which uniquely identifies a digital wallet provider or a digital wallet of a specific user. A provider-specific digital wallet identifier may identify a digital wallet provider facilitating a transaction and associated with a user's digital wallet. For example, a merchant may receive a digital wallet identifier "0012" and use the identifier to look up an associated digital wallet provider. A user-specific digital wallet identifier may identify the user or the user's specific digital wallet. For example, a merchant may receive a digital wallet identifier "31458271247" and use the identifier to look up an associated user or account holder. In some embodiments, both these types of identifiers may be separately included in transaction data. Alternatively, a single digital wallet identifier may act as both a provider-specific digital wallet identifier and a user-specific digital wallet identifier in that an entity, for example, a merchant, may identify both the digital wallet provider and the user, account holder, or digital wallet owner using the single identifier.

A "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device.

"transaction information" or "transaction data" may refer to any suitable information associated with a financial transaction, such as a transaction amount, a merchant identifier for a merchant associated with the transaction, the volume of the transaction, information about the goods or services being purchased, the merchant location, payment credentials, one or more digital wallet identifier, information contained in an authorization request message or clearing message, and any other information that is related to the current transaction.

I. Exemplary Transaction Processing System

FIG. 1 shows a system 100 according to an embodiment of the invention wherein transactions facilitated by a digital wallet provider may be processed. The system 100 comprises a user (not shown) who may operate a communication device, which is in, in this embodiment, a mobile device 110. The mobile device 110 has a trusted execution environment 111 associated therewith. The trusted execution environment 111 may, for example, be provided by a secure element on the mobile device or by a cloud storage (i.e., in one or more remote server computers). The user may use the mobile device 110 to conduct payment transactions in communication with an access device 120. Access device 120 may be connected to merchant computer 130, which may be connected to acquirer computer 140. Acquirer computer 140 may be connected to issuer computer 160 via payment processing network 150. The system further includes a digital wallet provider 170 that may be in communication with any of the entities in FIG. 1. In this embodiment, the digital wallet provider 170 is in communication with the issuer computer 160, payment processing network 150 and the mobile device 110. In some embodiments and as shown in FIG. 1, the digital wallet provider 170 is a third party service provider. The digital wallet provider may, alternatively, be the issuer or the payment processing network, or any other suitable entity.

An "issuer" may typically refer to a business entity (e.g., a bank) that maintains financial accounts for a user and often issues a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 130, acquirer computer 140, payment processing network 150, and issuer computer 160) to enable communications, or to perform one or more of the functions described herein.

The payment processing network 150 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

In some payment transactions, the user purchases a good or service at a merchant using the mobile device 110. The user's mobile device 110 can interact with an access device 120 at a merchant associated with merchant computer 130. For example, the user may tap the mobile device 110 against an NFC reader in the access device 120. Alternately, the user may indicate payment credentials to the merchant electronically, such as in an online transaction. Embodiments of the invention provide for the payment credentials provided to the merchant to include at least one digital wallet identifier.

An authorization request message may be generated by access device 120 or merchant computer 130 and then forwarded to the acquirer computer 140. In some embodiments, the access device may be a merchant computer, and access device 120 and merchant computer 130 may be provided by a single device or system component. After receiving the authorization request message, the authorization request message is then sent to the payment processing network 150. The payment processing network 150 then forwards the authorization request message to the corresponding issuer computer 160.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc.

An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc. Embodiments of the invention provide for the authorization request message to include at least one digital wallet identifier, and in some embodiments, for the authorization request message to be formatted such that the digital wallet identifier may be obtained therefrom by one or more of the merchant computer 130, acquirer computer 140, payment processing network 150 and issuer computer 160. The digital wallet identifier may be included in any suitable field in the authorization request message, including fields typically reserved for other uses, as will be well understood by those of ordinary skill in the art.

After the issuer computer 160 receives the authorization request message, the issuer computer 160 sends an authorization response message back to the payment processing network 150 to indicate whether the current transaction is authorized (or not authorized). The payment processing network 150 then forwards the authorization response message back to the acquirer computer 140. In some embodiments, payment processing network 150 may decline the transaction even if issuer computer 160 has authorized the transaction, for example depending on a value of the fraud risk score. The acquirer computer 140 then sends the response message back to the merchant computer 130.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 150) to the merchant computer 130 that indicates approval of the transaction. The code may serve as proof of authorization. As noted above, in some embodiments, a payment processing network 150 may generate or forward the authorization response message to the merchant.

After the merchant computer 130 receives the authorization response message, the merchant computer 130 may then provide the authorization response message for the user. The response message may be displayed by the access device 120, or may be printed out on a physical receipt. Alternately, if the transaction is an online transaction, the merchant may provide a web page or other indication of the authorization response message as a virtual receipt. The receipts may include transaction data for the transaction.

After authorization, a normal clearing and settlement process can be conducted by the payment processing network 150. A clearing process is a process of exchanging financial details between an acquirer and an issuer to facilitate posting to a user's payment account and reconciliation of the user's settlement position. In some embodiments, a digital wallet identifier, which may be a user-specific digital wallet identifier or a provider-specific digital wallet identifier, or both, may be included in such clearing communications.

In the system 100 shown in FIG. 1, a digital wallet is utilized by the user as a payment vehicle. The digital wallet provider 170 may include a digital wallet server computer accessible to the user via any suitable network and may also be in operational communication any of the other entities shown in FIG. 1 (or in some embodiments, the digital wallet server may comprise a part of the payment processing network). The digital wallet server may be programmed or configured to provide some or all of the functionality associated with conducting transactions using an digital wallet, including maintaining an association between the user's digital wallet and one or more payment accounts (such as a bank account or credit card account) in a digital wallet database 171. To provide digital wallet services (i.e. the use of the digital wallet associated with a payment account to conduct a financial transaction), the digital wallet server may further provide a web interface (e.g. through one or more web pages) to receive and transmit requests for payments services and/or may provide an application program interface (API) at the mobile device 110 to provide the web service. This process is described in more detail in U.S. Ser. No. 13/938,176 filed on Jul. 9, 2013, which is incorporated herein by reference in its entirety.

As noted above, the user's digital wallet may be stored in a digital wallet database 171, which may include information such as payment credentials associated with the user's payment accounts can be used in conducting a financial transaction with a merchant. For example, the digital wallet database 171 may include the PANs of one or more payment accounts (e.g., payment accounts associated with a credit card, debit card, etc) of the user. The digital wallet may be populated with such information during an initial enrollment process in which the user enters information regarding one or more of the payment accounts that may be associated with various issuers. Once the payment account information is added to the digital wallet database, the user may perform transactions by utilizing only his digital wallet. When a user performs a transaction using his digital wallet, the user need not provide the merchant with payment account information, but may instead provide payment credentials in the form of digital wallet information. This information may then be included in an authorization request message, which in turn may be provided to payment processing network 150. The payment processing network 150 may then access the user's digital wallet via a request to the digital wallet server, or may have direct access to the digital wallet database 171 so as to obtain the corresponding payment account information indicated by the information in the authorization request message. In embodiments of the invention, at least one digital wallet identifier is also stored along with other details of the user's digital wallet in the digital wallet database 171. The digital wallet identifier may be provisioned to the mobile device 110 or may be retrieved by the mobile device 110 at the time of initiating a transaction such that it can be provided to the merchant along with other payment credentials. The digital wallet identifier may be provider-specific and thus the same for all digital wallets stored in the digital wallet database 171, or may be user-specific such that each digital wallet in the digital wallet database 171 is uniquely identifiable. These aspects will be described in greater detail in what follows.

A digital wallet client may be provided as any suitable software that provides front end functionality of the digital wallet to the user. For example, the digital wallet client may be embodied as a digital wallet software application downloadable by a communication device such as the mobile device 110 (which may be a mobile phone). In some instances, the digital wallet client may provide a user interface (such as a series of menus or other elements) that allows the user to manage his digital wallet(s) (i.e. the digital wallet client may enable interaction with the digital wallet server, and thereby the digital wallet database 171). In some embodiments, the digital wallet client may store data in a computer-readable memory for later use, such as user preferences or identifiers associated with funding sources added to the digital wallet. The data may be stored in a secure execution environment 111 associated with the mobile device of the user.

II. Exemplary Mobile Device

Figure 2:
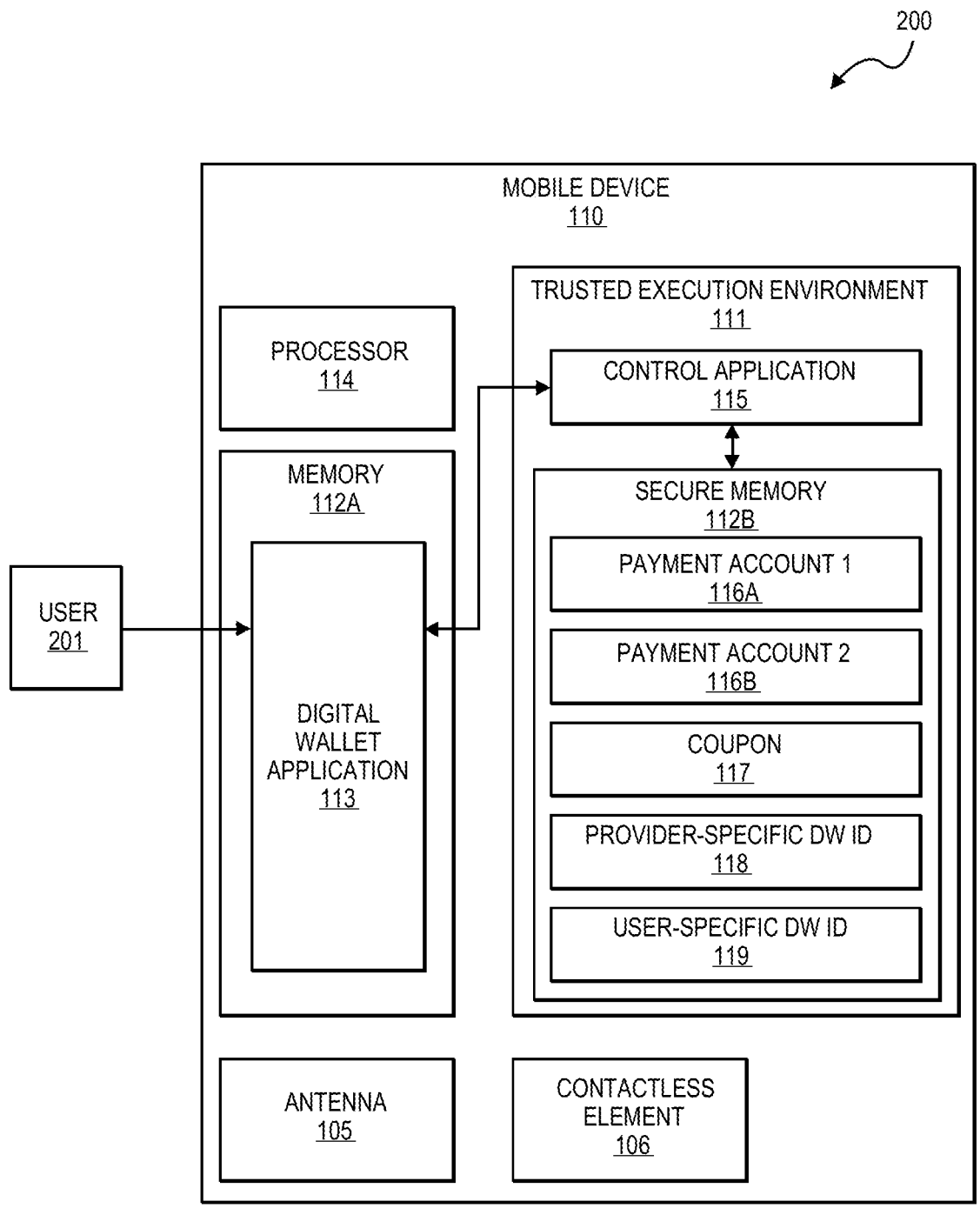
FIG. 2 illustrates a block diagram of a mobile device according to embodiments of the invention.

An embodiment of a mobile device is shown in FIG. 2. In this exemplary embodiment, a more detailed view of components of the exemplary mobile device 110 of FIG. 1 is shown, along with a user 201 that is capable of interacting with the mobile device 110.

The mobile device 110 may be used to perform mobile banking operations, such as initiating transactions and receiving and displaying transaction alerts, in accordance with some embodiments of the present invention. The mobile device 110 includes a processor 114 that may access a memory 112A (or another suitable data storage region or element) to retrieve instructions or data used in executing the instructions. The memory 112A may store information such as financial information, transit information (e.g., as in a subway or train pass), access information (e.g., access badges), serial numbers, mobile account information, and any other suitable information. In general, any of this information may be transmitted by the mobile device 110 (such as to an access device), via any suitable method, including through the use of antenna or a contactless element. An antenna 105 may be operatively coupled to the processor 114 and may provide the mobile device 110 with the ability to communicate through a long range communication channel with a mobile network operator. A contactless element 106 may also be operatively coupled to the process 114 and may provide the mobile device 110 with the ability to communicate through a shorter range communication channel (e.g. with NFC) with an access device such as a POS terminal.

The memory 112A may store instructions for a digital wallet application 113. The mobile device 110 may have any number of mobile applications installed or stored on the memory 112A and is not limited to that shown in FIG. 2. The digital wallet application 113 may provide a user interface for the user 201 to provide input and initiate, facilitate, and manage transactions using the mobile device 110. The transactions may include contactless transactions, e-commerce transactions, or any other suitable transactions, as one of ordinary skill would recognize.

The digital wallet application 113 is capable of communicating with the digital wallet provider 170 and can be configured to communicate with a control application 115 in a trusted execution environment 111 of the mobile device 110. In the embodiment of FIG. 2, the trusted execution environment 111 can be a secure element on the mobile device 110. The trusted execution environment 111 includes a secure memory 112B. Data in the secure memory 112B may be accessed, stored and retrieved by the digital wallet application 113 via the control application 116, for example, through a secure and encrypted communication channel. One of ordinary skill in the art will appreciate that the trusted execution environment is not limited to a secure element or the particular logical arrangement shown in FIG. 2, and may include other environments or communication protocols, such as a secure environment provided on a remote server computer (e.g., in cloud storage).

The digital wallet application 113 may have an application programming interfaces (API) configured in order to communicate with the control application 115. For example, the digital wallet application 113 may communicate with the control application 115 to retrieve payment credentials associated with one of a number of payment accounts, in this example a first payment account 116A or a second payment account 116B, loaded onto the digital wallet, or to store or retrieve coupons 117 loaded onto the digital wallet, or the like. In embodiments of the invention, and as shown in FIG. 2, the secure memory 112B may further store at least one digital wallet identifier, such as a provider-specific digital wallet identifier 118 and/or a user-specific digital wallet identifier 119, which can be retrieved and presented to a merchant as part of payment credentials used to conduct a transaction. In other embodiments, the digital wallet identifiers 118, 119 need not be stored in the secure memory 112B or the trusted execution environment 111, but could be stored in another area of the mobile device 110. The digital wallet identifiers 118, 119 may also be encrypted and stored on the mobile device 110 if desired.

The secure memory 112B in the mobile device 110 and data or control instructions that are transmitted via a cellular network may be applied to the secure memory 112B through a secure element interface. The secure element interface may function to permit the exchange of data and/or control instructions between the mobile device circuitry and the secure memory 112B. The secure memory 112B may include an NFC data transfer element (or another form of short range communications technology). The secure memory 112B may be in the form of a secure element, which may be implemented in the form of a semiconductor chip (or other data storage element). It may also be associated with a associated wireless transfer (e.g., data transmission) element, such as an antenna.

The secure memory 112B of the trusted execution environment 111 may comprise any hardware or software component operable to securely store payment credentials such as card details, payment tokens, digital wallet identifiers, and any other information such as coupons or tickets. The trusted execution environment 111 may be accessed to generate payment data and dynamic values (e.g., a dynamic cryptogram, payment token, or dynamic secure card verification values) to ensure an issuer or payment processing network that a transaction originating at the digital wallet application 113 is authentic. The mobile device 110 may have any number of applications installed or stored on the trusted execution environment 111 and is not limited to that illustrated in FIG. 2.

Any suitable API, service, application, applet, or other executable code may be employed to store and retrieve payment credentials or other information from the trusted execution environment 111 and communicate with an access device to complete a transaction. One or more of the applications, such as the applications described with reference to FIG. 2, may be provisioned to the mobile device 110 and/or trusted execution environment 111 by the digital wallet provider or by a trusted service manager associated with the digital wallet provider, a mobile network operator, an issuer or other third party.

It should be appreciated that all of the payment credentials required for conducting a transaction need not be stored in the trusted execution environment 111. For example, the digital wallet identifier may be encoded into the digital wallet identifier 113 and thus stored in the memory 112A, while sensitive account details such as the user's PAN may be stored in the secure memory 112B of the trusted execution environment 111. Additionally, some payment credentials, such as payment tokens, may be dynamically generated and/or provisioned to the mobile device and thus not stored in a memory associated with the mobile device. In some embodiments, at least some of the payment credentials provided to an access device of a merchant are obtained from a trusted execution environment such as a secure element. In other embodiments, the payment credentials may be encrypted or otherwise obfuscated on the phone, and need not be stored in the trusted execution environment 111.

III. Exemplary Registration and Transaction Flows

Figure 3:
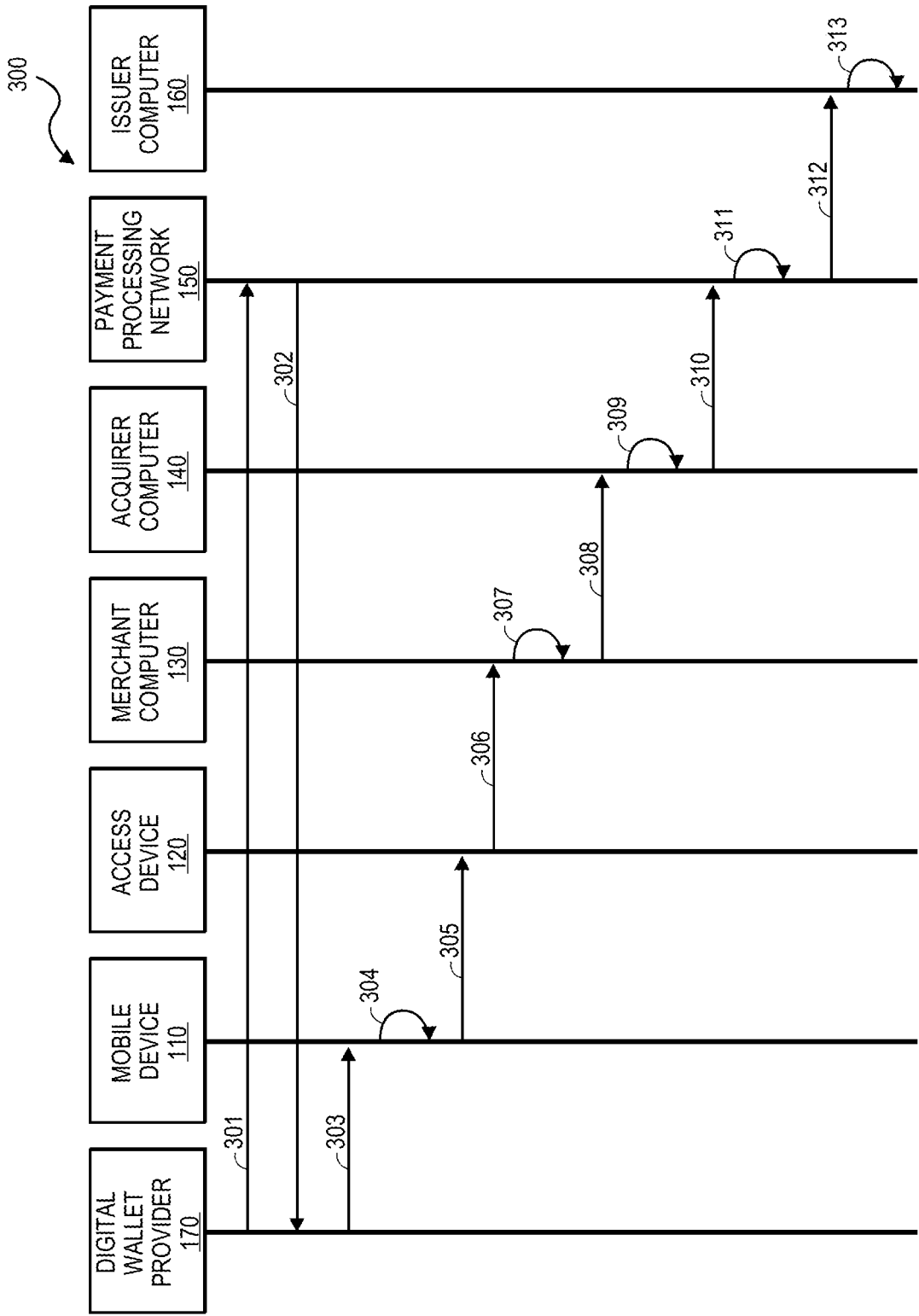
FIG. 3 illustrates a flow diagram showing registration of a digital wallet provider and a transaction flow according to embodiments of the invention.

The flow diagram 300 of FIG. 3 illustrates an exemplary embodiment of the invention implemented using the system 100 of FIG. 1, wherein a digital wallet provider registers with a payment processing network to obtain a digital wallet identifier, and wherein a user subsequently uses a mobile device to conduct a transaction facilitated by the digital wallet provider.

At step 301, the digital wallet provider 170 transmits a request for a digital wallet identifier to the payment processing network 150. The payment processing network 150 may then generate the digital wallet identifier. Alternatively, the payment processing network 150 may request that a third party generate the digital wallet identifier and/or provision the digital wallet identifier to the digital wallet provider 170. The digital wallet identifier may, for instance, be assigned by an organization associated with standards (e.g. ISO) or another entity. In some embodiments, acquiring and issuing institutions may be enabled to register their digital wall providers with the payment processing network 150 using, for example, an online tool (e.g., a digital wallet provider registration web portal). Whatever the case may be, the digital wallet identifier is then associated with the digital wallet provider such that it can be used to identify a digital wallet provider facilitating a subsequent transaction. In such cases, the digital wallet identifier is a provider-specific digital wallet identifier.

In some embodiments, and as illustrated in FIG. 3, the payment processing network 150 generates the digital wallet identifier, associates the digital wallet identifier with the digital wallet provider 170 and, at step 302, provides the digital wallet identifier to the digital wallet provider 170. The provider-specific digital wallet identifier may be any suitable unique identifier. For example, the digital wallet identifier may be an eight digit number. In some embodiments, instead having a digital wallet identifier generated on its behalf, the digital wallet provider 170 may provide a unique digital wallet identifier to the payment processing network 150 such that the payment processing network 150 may associate the digital wallet provider 170 with that digital wallet identifier. In some embodiments, the digital wallet identifier may be dynamic, signed using a key and/or transmitted to and from the digital wallet provider and/or mobile device of the user in an encrypted format.

Registration of the digital wallet provider 170 may entail capturing a variety of details of the digital wallet provider 170. For example, one or more of the following may be captured: name, address, acquiring institution, issuing institution, country, registration date, entity that registered the digital wallet provider (e.g. acquirer, issuer, or, as in this embodiment, the payment processing network). In some embodiments, a questionnaire may be provided to determine whether the digital wallet provider can conduct pass-through and/or two-step transactions, as will be described in greater detail below. In one embodiment, information obtained in this regard may be used as part of qualification criteria for digital wallet provider-specific interchange fee programs.

In some embodiments, the digital wallet provider 170 may be requested to provide further information, such as: details regarding adherence to risk and compliance criteria, including PCI DSS (Payment Card Industry Data Security Standard), AML (Anti Money Laundering) and KYC (Know Your Customer) procedures, or details regarding countries and regions of operation of the digital wallet associated with the digital wallet provider. The payment processing network 150 may store a digital wallet provider profile including, for example, at least some of the information described above. The digital wallet profile may be made available to employees and clients of the payment processing network, for example, to merchants, acquirers and issuers, such that they may have access to the information stored in the digital wallet profile upon or after receipt of the digital wallet identifier during a transaction. The digital wallet profile may also be made available to such entities for downstream reporting, interchange processing, dispute processes, and the like.

In some embodiments, the digital wallet provider 170 may, alternatively or in addition to the provider-specific digital wallet identifier set out above, be provided with a unique digital wallet identifier for each digital wallet it issues to a user. In such a case, the digital wallet identifier is a user-specific digital wallet identifier. When a user transacts with its digital wallet, the user-specific digital wallet identifier may serve to identify the user, an account of the user or the digital wallet of the user to entities such as merchants, acquirers, or issuers. These entities may access the digital wallet profile described above to obtain details of the user or digital wallet upon receiving a user-specific digital wallet identifier during a transaction. A user-specific digital wallet identifier may be any suitable unique identifier. For example, it may be a ten digit number. A single identifier may be used as both a provider-specific and a user-specific identifier. For example, the first four digits of a twelve digit number may identify the digital wallet provider, while the last eight digits of the twelve digit number may identify the specific user or digital wallet used to transact.

In some embodiments, the payment processing network 150 may be able to distribute or share the digital wallet identifiers with the issuer or acquirer who registered the digital wallet provider. In some embodiments, the payment processing network 150 may be able to bill the issuer or acquirer a registration fee and an annual or renewal participation fee for their digital wallet provider registration.

At step 303, the digital wallet provider 170 provides the digital wallet identifier to the mobile device 110 of the user. The digital wallet provider 170 may, for example, load the digital wallet identifier onto the digital wallet application of the mobile device 110, or may cause the digital wallet identifier to be stored in the trusted execution environment 111 associated with the mobile device 110, as described with reference to FIG. 2. The mobile device 110 may receive the digital wallet identifier over any suitable channel and may store the digital wallet identifier in the trusted execution environment 111. The digital wallet provider may load the digital wallet identifier assigned by the payment processing network into the digital wallet application as part of a configuring step. In some embodiments, the digital wallet identifier may be stored in a secure element of the mobile device 110 along with other payment credentials (e.g., PAN or a payment token, expiration date, card holder personal information such as name, address, phone number, etc.). In some embodiments, the payment credentials including the digital wallet identifier may be stored in a memory that may be associated with a cloud server. In one specific example, a static and provider-specific digital wallet identifier may be encoded into the digital wallet application such that, once the user downloads or installs the application, the digital wallet identifier becomes stored in a memory associated with the communication device of the user and can be transferred to an access device at the time of initiating a transaction.

Once a digital wallet provider has been registered and a digital wallet identifier has been generated and made available to the communication device of the user as discussed above, a transaction can be initiated by the user using the digital wallet application 113, as described below with reference to steps 304 to 313 in the exemplary transaction flow of FIG. 3.

At step 304, the user may approach a checkout counter of a merchant so as to be in proximity to the access device 120. The user may operate the mobile device 110 to open the digital wallet application and select a payment card to use for a transaction in favor of the merchant. The mobile device in turn interprets the user input as a request for payment credentials required to conduct a transaction. In some embodiments, at this stage, the digital wallet application may communicate with the trusted execution environment 111 associated with the mobile device 110 via an API to obtain the necessary payment credentials, including at least one digital wallet identifier. In one specific example, the payment credentials may be passed as a contactless data element for NFC transactions originating from the mobile device. The digital wallet identifier may be passed to the access device using any other suitable method such as two-dimensional barcodes or mPOS™ technology, as will be understood by those of ordinary skill in the art.

At step 305, the obtained payment credentials, which include the digital wallet identifier, are provided to the access device 120 associated with the merchant at which the user wishes to transact. In some embodiments, the communication between the mobile device 110 and the access device 120, for example, a POS terminal, may be based on a specification associated with contactless technology used for the transaction (e.g., as part of the EMV standards). A contactless payment method such as payWave™ may be employed. In some embodiments, a payment token is passed to the access device instead of conventional card details such as a PAN.

In some embodiments, the digital wallet identifier may be provided to the merchant in two separate messages. One message may include issuer application data for use by the payment processing network 150 and the issuer 160, and another message, for use by the merchant and/or the acquirer computer 140, may also include the digital wallet identifier. Examples of payment credentials provided to the access device associated with a merchant will be described in greater detail with reference to FIGS. 5 to 7 below. In some embodiments, the digital wallet identifier is included in a read record command generated and transmitted in accordance with EMV standards.

At step 306, the access device 120 initiates the transaction by generating an authorization request message including the payment credentials and transmitting it to the merchant computer 130 for onward transmission to the issuer computer 160. The access device may be a POS device configured to transmit the authorization request message to the issuer computer 160 via the acquirer computer 140 and the payment processing network 150. The access device 120 may transmit the authorization request message directly to the acquirer computer 140. In some embodiments, the access device 120 may be configured to format the authorization request message such that the digital wallet identifier is obtainable from the authorization request message by one or more of the merchant computer 130, the acquirer computer 140, the payment processing network 150 and the issuer computer 160.

The authorization request message may be formatted so as to include two separate instances of the digital wallet identifier, a first instance of the digital wallet identifier being included in issuer application data for extraction by the payment processing network 150 or the issuer computer 160, and a second instance of the digital wallet identifier being provided for extraction by the merchant computer 130 or the acquirer computer 140. The authorization request message may be formatted as described above to ensure that certain data, such as certain issuer application data, is not read and/or stored by certain entities such as merchants or acquirers.

At step 307, the merchant computer 130 may extract the digital wallet identifier from the authorization request message or may obtain the digital wallet identifier directly from the payment credentials provided from the mobile device 110 to the access device 120. The merchant may then use the digital wallet identifier for any number of purposes. For example, the merchant may identify the digital wallet provider and associate the transaction with a loyalty program or other benefits based on a provider-specific digital wallet identifier received. In another example, the merchant may wish to identify a digital wallet provider to partner with and analyze the number of transactions facilitated by each digital wallet provider to aid in decision-making. Further, the merchant may, for instance, identify the user based on a user-specific digital wallet identifier received and apply different rates, fees, benefits, or a loyalty program to the transaction based on the user or the digital wallet used. To identify the user, the merchant may, for example, transmit a request to the payment processing network 150 including the user-specific digital wallet identifier received, the payment processing network 150 in turn looking up the relevant user and notifying the merchant accordingly.

At step 308, the merchant computer 130 transmits the authorization request message to the acquirer computer 140. In some embodiments, the merchant computer 130 passes issuer application data (e.g., digital wallet identifier, payment information, and chip data) from the access device 120 to the acquirer computer 140 as part of the authorization request message. For example, the authorization request message may also comprise "transaction information," such as any information associated with a current transaction, such as the transaction amount, merchant identifier, merchant location, etc., as well as any other information that may be utilized in determining whether to identify and/or authorize a transaction. The acquirer computer 140 may, similarly to the merchant computer 130, at step 309, obtain the digital wallet identifier from the authorization request message and use the digital wallet identifier for a number of purposes.

In one example, the acquirer may store a provider-specific digital wallet identifier associated with each transaction and subsequently analyze which digital wallet providers are favored by users when transacting at a particular merchant. The acquirer may then use this information when planning to partner with a desired digital wallet provider, typically along with the merchant, to provide special offers or loyalty programs to users. In another example, in the case where a user may use different communication devices to generate payment tokens associated with the same digital wallet, the acquirer may use a user-specific digital wallet identifier included in authorization request messages to establish that the different payment tokens originate from the same digital wallet or user and apply benefits, fees or the like accordingly to the relevant user, regardless of the fact that the user used different payment tokens.

At step 310, the acquirer computer 140 may submit issuer application data including the digital wallet identifier in a field in the authorization request message to a server computer associated with the payment processing network 150 (e.g., Visa®). The acquirer computer 140 may further, in some embodiments, submit the digital wallet identifier in a field in a clearing message to the payment processing network 150. In some embodiments, a provider-specific digital wallet identifier and optionally a user-specific digital wallet identifier may be present in all transactions associated with the payment processing network 150 including authorization and clearing messages, wherein a digital wallet provider is facilitating the payment transaction.

The payment processing network 150 may obtain the digital wallet identifier from at least one of the above-mentioned messages, store the digital wallet identifier and/or use it for a variety of purposes, at step 311. For example, the payment processing network 150 may need to identify the digital wallet provider or the user's digital wallet to carry out consumer loyalty programs, discounts, offers, and other types of marketing programs associated with the use of a particular digital wallet. For example, the payment processing network 150 may offer rewards to a user when using a digital wallet provisioned by a particular digital wallet provider to transact. Such offers may form part of cooperative work between the payment processing network and the digital wallet provider, or between any two or more of the entities shown in FIG. 3.

Further, the payment processing network 150 may wish to identify transactions as being conducted with a certain digital wallet or as facilitated by a particular digital wallet provider for fraud analysis or risk management purposes. For example, a higher level of security such as an additional security factor may be applied once the payment processing network 150 identifies a certain digital wallet provider corresponding to the digital wallet identifier. It may also be favorable to distinguish digital wallet transactions from other transaction types, for example, for improved user support and transaction error analysis. Any suitable data mining may further be carried out using the digital wallet identifiers received at the payment processing network 150. For example, the payment processing network 150 may build a risk profile for a specific user by analyzing transactions having the same user-specific digital wallet identifier. As a result, risk management may be improved and/or fraud may be reduced.

At step 312, the payment processing network 150 may pass the digital wallet identifier on to the issuer computer 160. For example, the payment processing network 150 may forward the authorization request message to the issuer computer 160. In some embodiments, the authorization request message may be formatted such that the payment processing network 150 can obtain the digital wallet identifier and include it in a subsequent clearing message that is sent to the issuer during a subsequent clearing and settlement process. The issuer computer 160 may, in some embodiments, validate the format of the digital wallet identifier it receives and use it to determine the digital wallet provider's eligibility to participate in the transaction.

The issuer may, similar to the payment processing network 150, store the digital wallet identifier and use it for a number of purposes. For example, the issuer may wish to partner with a third party digital wallet provider such that the issuer's account holders may be issued with digital wallets by the digital wallet provider. In such a case, the issuer may analyze digital wallet identifiers in transactions to determine which digital wallet providers are favored by its account holders. In cases where the issuer is also the digital wallet provider, the issuer may apply a higher level of security, for example, multi-factor security, to transactions facilitated by other digital wallet providers, while it applies a lower level of security, for example, single-factor security, to transactions facilitated by its own digital wallet product.

The issuer computer 160 may generate an authorization response message that may be provided to the mobile device 110 via the payment processing network 150, the acquirer computer 140 and the merchant computer 130. As noted above, after a transaction is authorized by the issuer computer 160, a clearing and settlement process may take place between the acquirer computer 140, the payment processing network 150, and the issuer computer 160. In some embodiments, the digital wallet identifier may be extracted by the acquirer computer 140 or the payment processing network 140 from the authorization request message from the merchant computer 130, but may then be submitted to the payment processing network 150 or the issuer computer 160 in a clearing message.

Figure 4:
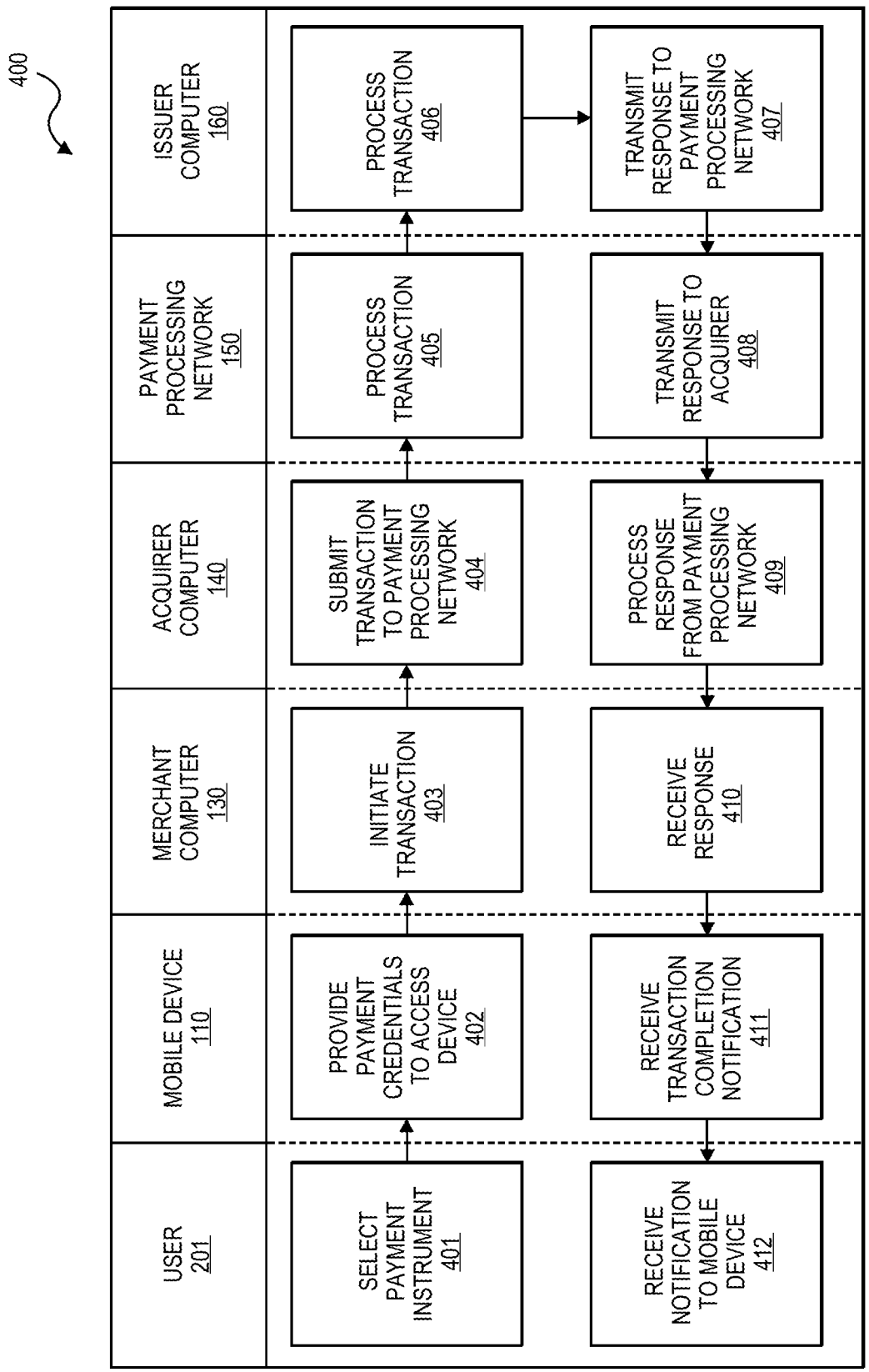
FIG. 4 illustrates a flow diagram showing a transaction flow according to embodiments of the invention.

A further transaction flow will be set out with reference to FIG. 4 below. The flow diagram 400 of FIG. 4 illustrates an exemplary transaction flow 400 for a transaction facilitated by a digital wallet provider. In this example, the payment transaction is a pass-through purchase transaction using a digital wallet at an NFC terminal.

At step 401, the user operates the mobile device 110 so as to select a payment instrument via the digital wallet application 113. In some embodiments, at least some of the payment credentials associated with the payment instrument may be remotely stored. In such a case, the mobile device 110 may communicate with the digital wallet provider 170 to obtain the payment credentials required to conduct the transaction from a cloud storage. The digital wallet provider 170 may, for example, look up the payment credentials in the digital wallet provider database 171 and transmit the payment credentials to the mobile device over a communication channel that is end-to-end secure (encrypted). Alternatively, the required payment credentials may be stored on a memory of the mobile device 110, typically in a secure element, and may be obtained as described with reference to FIG. 2. At step 402, the obtained payment credentials are provided to an NFC-enabled access device of the merchant via the mobile device 110, which is also NFC-enabled.

At step 403, the merchant computer 130 initiates the transaction. In some embodiments, the transaction may be initiated when the access device generates an authorization request message which includes the digital wallet identifier, which may be one or both of user-specific and provider-specific, and transmits it to the acquirer computer 140. The merchant may obtain the digital wallet identifier as described with reference to FIG. 3, or in any other suitable manner. The acquirer computer 140 then, at step 404, transmits the authorization request message to the payment processing network 150, and may also obtain and use the digital wallet identifier.

At step 405, the payment processing network 150 processes the transaction in a conventional fashion and may obtain the digital wallet identifier. At step 406, the issuer computer 160 processes the transaction and sends a response to the payment processing network 150, at step 407, either authorizing or declining the transaction. The issuer may also obtain the digital wallet identifier at this stage.

At step 408, the payment processing network 150 transmits the response to the acquirer computer 140, and the acquirer computer 140 processes the response from the payment processing network 150 at step 409. At step 410, the merchant computer 130 receives the response from the acquirer computer 140. At step 411, the mobile device 110 receives the response either from the merchant computer 130, the acquirer computer 140 and/or the payment processing network 150. In some embodiments, these response messages may include the digital wallet identifier. The user 201 then, at step 412, receives a notification via the digital wallet application 113 on the mobile device 110, indicating that the transaction was authorized or declined.

It should be appreciated that in, in some embodiments, the merchant may be an online merchant and the user need not physically travel to the merchant's location to, for instance, conduct an NFC transaction. In such embodiments, the digital wallet provider may act as a payment gateway that initiates the transaction. In one specific example, the user uses an online tool provided by the digital wallet provider and transmits the required payment credentials to the merchant via the online tool, which enables the digital wallet provider to act as a payment gateway. The remainder of the transaction may proceed in a conventional fashion. In some embodiments, the digital wallet provider may receive an authorization or denial response from the merchant's acquirer and notify both the merchant and the user of the response.

Embodiments of the invention thus provide methods and systems to enable a digital wallet identifier to be present in communications such as authorization and/or clearing messages associated with transaction data in transactions that are facilitated by a digital wallet provider. A digital wallet identifier may be used to support consumer loyalty programs, discounts, offers, and other types of marketing programs associated with the use of a particular digital wallet. Embodiments of the invention are not limited to financial instruments such as payment cards, but may apply to other monetizable instruments such as loyalty cards or coupons.

In some embodiments, the identification of transactions conducted by the digital wallet provider may be used for program management (for example, it allows for transactions conducted with a digital wallet to be identified and distinguished from other transactions), risk scoring, chargeback and dispute management, and customer support (for example, the digital wallet identifier may help to identify in which manner a transaction was conducted). In addition, identifying transactions conducted by a digital wallet provider may also be used for assigning different fees and interchange rates specific to a category of digital wallet providers or a specific digital wallet provider. In some embodiments, the digital wallet identifier may be used to whitelist or blacklist digital wallet providers, to assign risk or security properties to certain digital wallet providers, and the like.

IV. Exemplary Payment Credentials

Figure 5:
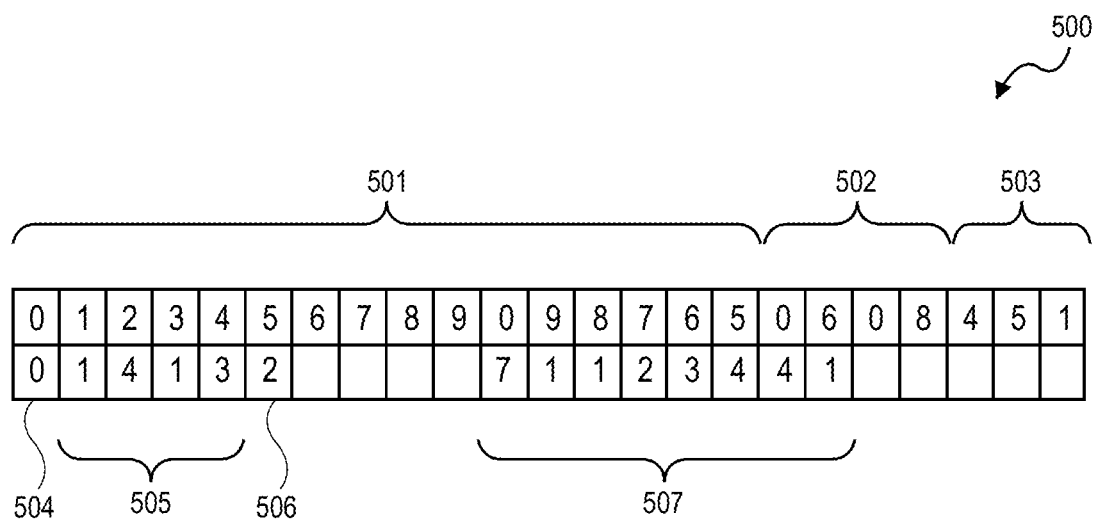
FIG. 5 illustrates a first example of payment credentials provided to an access device according to embodiments of the invention.
Figure 6:
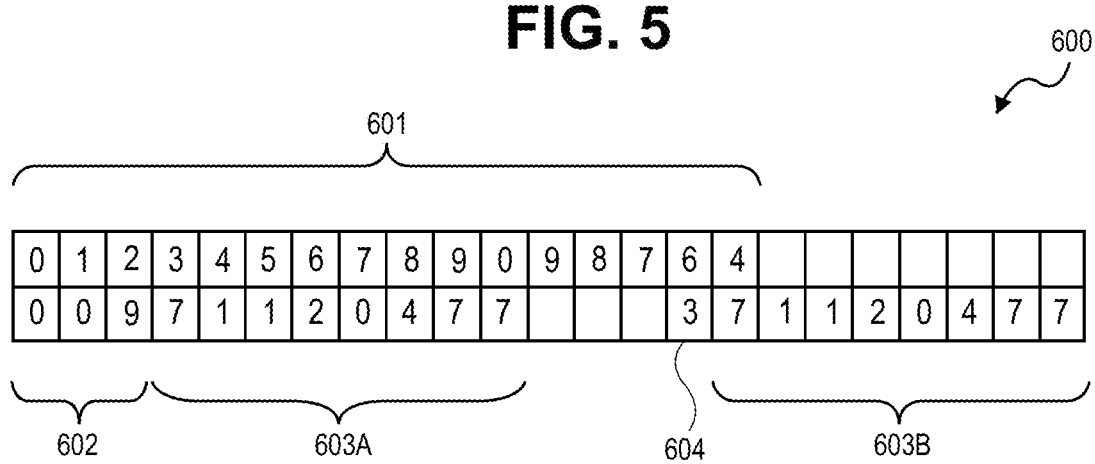
FIG. 6 illustrates a second example of payment credentials provided to an access device according to embodiments of the invention.
Figure 7:
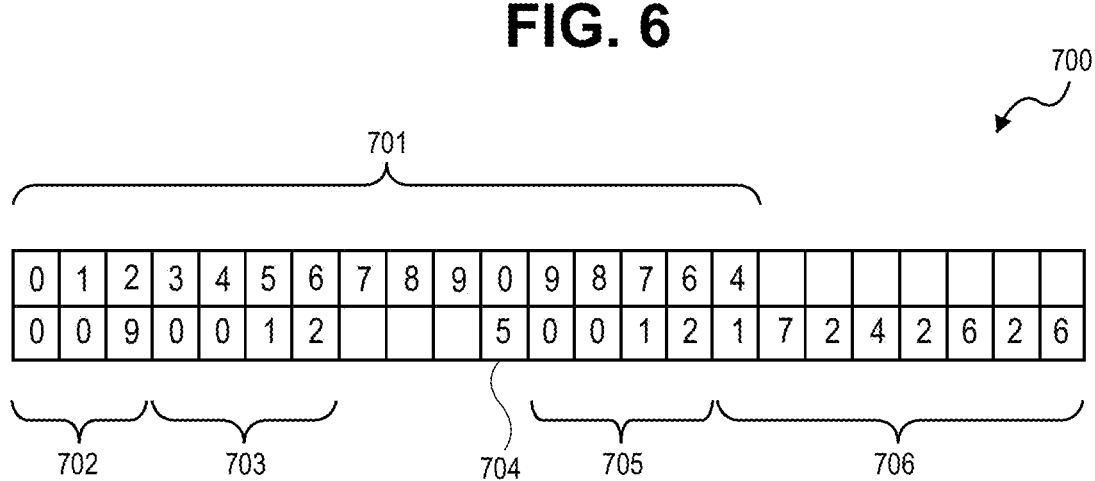
FIG. 7 illustrates a third example of payment credentials provided to an access device according to embodiments of the invention.

FIGS. 5 to 7 show exemplary records of payment credentials which can be provided from a user's communication device to an access device according to embodiments of the invention. It should be appreciated that the examples are primarily shown for exemplary purposes and are not intended to limit the scope of the invention.

The payment credential record 500 in FIG. 5 is created by concatenating a PAN 501 associated with a payment account loaded onto the digital wallet with its corresponding expiration date 502, service code 503, a Pin Verification Key Indicator (PVKI) character 504, and a field for PIN verification data 505. In some embodiments, the PAN 501 is sixteen digits long, the expiration date 502 is four digits long, the service code 503 is three digits long, the PVKI 504 is one digit long, and the PIN verification data 505 is four digits long. However, the primary account number 501, the expiration date 502, the service code 503, the PVKI 504, and the PIN verification data 505 are not limited to being these lengths. The payment credential record 500 may include any other suitable credentials or transaction-related data.

Next, in a field which may typically be reserved for other uses, a value is placed as an indicator 506 that a digital wallet identifier has been included in this payment credential record 500. The value of this indicator 506 may be known by the access device and/or merchant. Next, the digital wallet identifier 507 is placed in a predefined field which may also typically be reserved for other uses. In the embodiment shown in FIG. 5, the digital wallet identifier is a provider-specific digital wallet identifier and is eight digits long. Upon receipt of the payment credential record 500, the access device or merchant computer may recognize the digital wallet identifier 507 and include it in an authorization request message, as described above. Further, the merchant may extract the digital wallet identifier 507 from the payment credential record 500 and use it for business purposes, for example, for one or more of the purposes described with reference to FIG. 3 above.

In the second exemplary payment credential record 600 illustrated in FIG. 6, a payment token 601 is provided to the merchant instead of a PAN, expiry date and service code. The record 600 further includes a token request identifier which includes a token service provider identifier 602 concatenated with a digital wallet identifier 603A. The token service provider identifier 602 may identify a service provider which generated the payment token used to represent the payment account of the user in a process commonly known as "tokenization". In this example, the record 600 further includes an indicator 604 serving to indicate that a separate field is provided for the merchant or acquirer which also includes the digital wallet identifier 603B. In this case, the first instance of the digital wallet identifier 603A forms part of issuer application data intended for the payment processing network and issuer, while the second instance of the digital wallet identifier 603B is provided for the merchant and acquirer.

In the first and second examples, the digital wallet identifier is a provider-specific digital wallet identifier. In the third exemplary payment credential record 700 illustrated in FIG. 7, the record 700 includes both a provider-specific digital wallet identifier 703 and a user-specific digital wallet identifier 706. The record 700 includes a payment token 701, a token service provider identifier 702 concatenated with the provider-specific digital wallet identifier 703, and an indicator 704 serving to indicate that a separate field is provided for the merchant or acquirer. The separate field includes both a second instance of the provider-specific digital wallet identifier 705 and a user-specific digital wallet identifier 706. In this example, the payment credentials obtained by the mobile device and provided to the access device thus includes both a provider-specific digital wallet identifier and a user-specific digital wallet identifier, the provider-specific digital wallet identifier identifying a digital wallet provider associated with the transaction and the user-specific digital wallet identifier identifying a digital wallet of the user.

Including a user-specific digital wallet identifier may be advantageous especially to merchants and acquirers. For example, a transaction may be initiated by providing payment credentials in the form of a payment token instead of providing conventional account information such as a Primary Account Number (PAN) to a merchant. One user may use various payment tokens, in which case the user-specific digital wallet identifier may be used by the merchant or acquirer to identify the user or its account as being associated with each of the payment tokens.

V. Exemplary Server Computer in a Payment Processing Network

Figure 8:
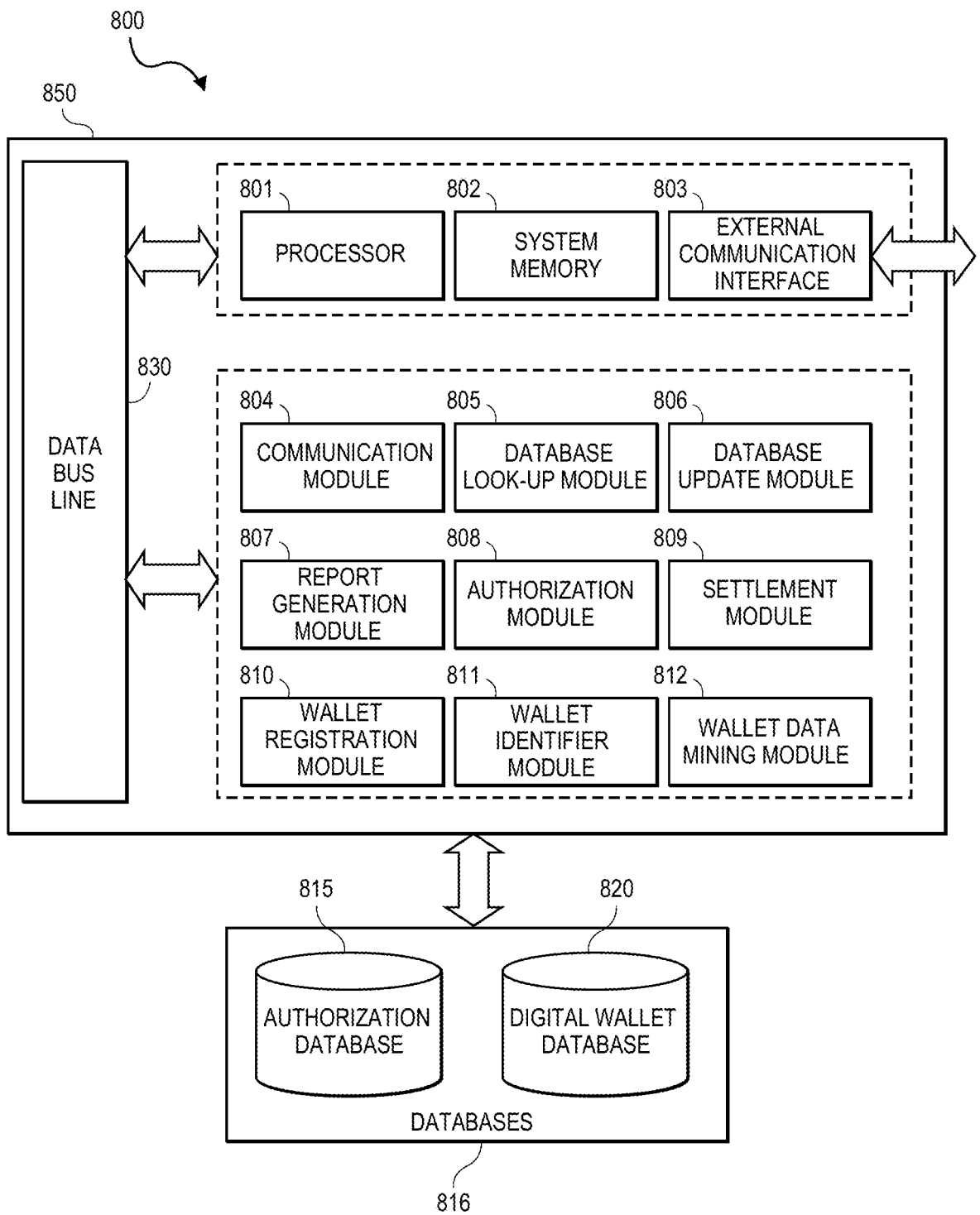
FIG. 8 shows a block diagram of an exemplary server computer in a payment processing network according to embodiments of the invention.

With reference to FIG. 8, an exemplary server computer 850 in a payment processing network 800 (or other network) is shown. Such a server computer 850 may be used in embodiments of the invention. The exemplary server computer 850 is illustrated as comprising a plurality of hardware and software modules (801-812). However, it should be appreciated that this is provided for illustration purposes only, and each of the modules and associated functionality may be provided and/or performed by the same or different components. That is, the exemplary server computer 850 may, for example, perform some of the relevant functions and steps described herein with reference to the payment processing network 800 through the use of any suitable combination of software instructions and/or hardware configurations. It should be noted that although FIG. 8 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). It is also not necessary that the illustrated server computer be in a payment processing network, and some or all components may be part of a different type of system.

The exemplary server 850 is shown as comprising a processor 801, system memory 802 (which may comprise any combination of volatile and/or non-volatile memory such as, for example, buffer memory, RAM, DRAM, ROM, flash, or any other suitable memory device), and an external communication interface 803. Moreover, one or more of the modules 804-812 may be disposed within one or more of the components of the system memory 802, or may be disposed externally. As was noted above, the software and hardware modules shown in FIG. 8 are provided for illustration purposes only, and the configurations are not intended to be limiting. The processor 801, system memory 802 and/or external communication interface 803 may be used in conjunction with any of the modules described below to provide a desired functionality. Some exemplary modules and related functionality may be as follows.

A communication module 804 may be configured or programmed to receive and generate electronic messages comprising information transmitted through a system such as to or from any of the entities shown in the system 100 of FIG. 1. When an electronic message is received by the server computer 850 via external communication interface 803, it may be passed to the communications module 804. The communications module 804 may identify and parse the relevant data based on a particular messaging protocol used in the system. The received information may comprise, for instance, identification information, transaction information, and/or any other information that the payment processing network may utilize in authorizing a financial transaction or performing a settlement and clearing procedure. The communication module 804 may then transmit any received information to an appropriate module within the server computer 850 (e.g. via a data bus line 830). The communication module 804 may also receive information from one or more of the modules in server computer 850 and generate an electronic message in an appropriate data format in conformance with a transmission protocol used in the system so that the message may be sent to one or more components within the system (e.g. to an issuer computer or merchant computer). The electronic message may then be passed to the external communication interface 803 for transmission. The electronic message may, for example, comprise an authorization response message (e.g. to be transmitted to a merchant conducting a transaction) or may be an authorization request message to be transmitted or forwarded to an issuer.

A database look-up module 805 may be programmed or configured to perform some or all of the functionality associated with retrieving information from one or more databases 816. In this regard, the database look-up module 805 may receive requests from one or more of the modules of server 850 (such as communication module 804, authorization module 808, settlement module 809, wallet identifier module 811 or wallet data mining module 812) for information that may be stored in one or more of the databases 816. The database look-up module 805 may then determine and a query an appropriate database. The database update module 806 may be programmed or configured to maintain and update the databases 816, such as authorization database 815 and a digital wallet database 820. In this regard, the database update module 806 may receive information about a user, financial institution, a payment device, and/or current or past transaction information from one of the modules discussed herein. This information may then be stored in the appropriate location in the database using any suitable storage process.

The report generation module 807 may be programmed or configured to perform some or all of the functionality associated with generating a report regarding a user, an account, a transaction or transactions, or any other entity or category of information with regard to a system such as that of FIG. 1. This may include, for instance, identifying patterns (such as patterns that indicate a fraudulent transaction or transactions) and generating one or more alerts that may be sent (e.g. via communication module 804 and external communication interface 803) to one or more entities in the system 100, including the mobile device, merchant computer, or issuer computer. The report generation module 807 may also, for example, request information from one or more of the databases 816 via database look-up module 805.

The authorization module 808 may be configured or programmed to perform some or all the functionality associated with authorizing a financial transaction associated with an authorization request message. An authorization request message may be generated by a merchant computer and may be associated with a transaction involving the payment device. The authorization module 808 may, for instance, be programmed or configured to compare the information received by via the authorization request message with stored information at the server 850 or a database (such as one comprising verification values). In some embodiments, if the received and stored values match, the authorization module 808 may authorize the transaction (or may be more likely to authorize the transaction) and may instruct the communication module 801 to generate an authorization response message. The authorization module 808 may also be programmed or configured to execute any further operations associated with a typical authorization. In some embodiments, the authorization module 808 may check a digital wallet identifier included in an authorization request message and authorize or decline a transaction based at least in part on the digital wallet identifier. The authorization module 808 may further extract a digital wallet identifier from an authorization request message and cause it to be stored in a database (such as the digital wallet database 820) or transmit it to a different module (such as the wallet identifier module 811).

The settlement module 809 may be configured or programmed to perform some or all the functionality associated with transaction clearing and settling an authorized transaction. The settlement module 809 may be programmed or configured to cause the exchange of financial details between an acquirer and an issuer to facilitate posting to a user's payment account and reconciliation of the user's settlement position. In some embodiments, a digital wallet identifier, which may be a user-specific digital wallet identifier or a provider-specific digital wallet identifier, or both, may be included in such clearing communications by the settlement module 809.

The server computer 850 may further include a wallet registration module 810. The wallet registration module 810 may be configured or programmed to receive a request, originating from a digital wallet provider, for a digital wallet identifier, generate the digital wallet identifier, associate the digital wallet identifier with the digital wallet provider or with a digital wallet of a user, and cause the digital wallet identifier to be transmitted to the digital wallet provider. Generating the digital wallet identifier may involve requesting that the wallet identifier module 811 generate the digital wallet identifier. The digital wallet identifier may be uniquely associated with a specific digital wallet provider (provider-specific) or with a specific digital wallet or user (user-specific). In the case where the identifier is provider-specific, associating the digital wallet identifier with the digital wallet provider may involve storing, in the digital wallet database 820, a record which includes the digital wallet identifier and the digital wallet provider it is assigned to, such that the digital wallet identifier and the digital wallet provider may be unambiguously associated with each other. In the case where the identifier is user-specific, the request originating from the digital wallet provider may identify the user or digital wallet for which an identifier is requested, and, in such a case, associating the digital wallet identifier with the digital wallet provider may involve storing, in the digital wallet database 820, a record which includes the digital wallet identifier and a particular digital wallet or user it is assigned to such that the digital wallet or user is unambiguously associated with the digital wallet identifier. In some cases, the generated digital wallet identifier may identify both the digital wallet provider and specific digital wallet or user.

The server computer 850 of the payment processing network 800 may further include a wallet identifier module 811. The wallet identifier module 811 may be configured to generate unique digital wallet identifiers, store digital wallet identifiers in records in the digital wallet database 820, and/or look up records in the digital wallet database 820 upon receipt of a digital wallet identifier or other data associated with a digital wallet provider or digital wallet of a user. The wallet identifier module may further be configured or programmed to store and/or manage a digital wallet profile in the digital wallet database 820 as described with reference to FIG. 3. Such a digital wallet profile may be made available to employees and clients of the payment processing network, for example, to merchants, acquirers and issuers. In some embodiments, a dedicated wallet data mining module 812 may be provided which may be configured or programmed analyze transaction data for transactions facilitated by digital wallet providers. For example, the wallet data mining module 812 may be configured or programmed to generate statistics relating to digital wallet providers favored or frequently used by users, to generate risk profiles for digital wallet providers or user digital wallets, to aid in whitelisting or blacklisting digital wallet providers or digital wallets, and the like.

The payment processing network may include one or more databases 816, such as authorization database 815 and the digital wallet database 820. Each of the databases shown in this example may comprise more than one database, and may be located in the same location or at different locations. The authorization database 815 may contain information related to a payment device and/or a payment account, as well as any other suitable information (such as transaction information) associated with the payment account. For example, the authorization database 815 may comprise a relational database having a plurality of associated fields, including a primary account identifier (e.g. a PAN), an issuer associated with the account, expiration date of a payment device, a verification value(s), an amount authorized for a transaction, a user name, user contact information, prior transaction data, etc. In some embodiments, the authorization module 808 may utilize some or all of the information stored in the authorization database 815 when authorizing a transaction. The digital wallet database 820 may comprise any of the information set out above, such as records of digital wallet identifiers and the digital wallet providers or digital wallets they are assigned to, as well as digital wallet profiles. In some embodiments, the authorization module 808 may utilize information stored in the digital wallet database 820 when authorizing a transaction or when determining risk or security properties associated with a transaction. The databases 816 may also comprise a number of additional databases.

Embodiments of the invention thus enable a digital wallet identifier to be present in communications associated with transaction data of transactions that are facilitated by a digital wallet provider. Embodiments described herein provide a mechanism or technique which can be used to identify a digital wallet provider associated with a transaction by downstream entities in a typical transaction flow, for example, by a merchant or an acquirer associated with the merchant. As a result, these downstream entities may be capable of obtaining sufficient data relating to transactions facilitated by digital wallet providers. The data may be advantageously used for any number of purposes, as described throughout the specification.

VI. Additional Embodiments

Although the exemplary embodiments described above are directed to a four-party transaction model in which the issuer and acquirer are separate entities, the scope of the invention is not limited to such a transaction model. For example, in a three-party transaction model in which the issuer and acquirer is essentially the same entity, the digital wallet provider may be a third party service provider. A user may be capable of choosing from a variety of digital wallets with which to transact in the three-party system.

The various participants and elements described herein with reference to FIGS. 1 to 8 may operate one or more computer apparatuses to facilitate the functions described herein. Any of the elements in FIGS. 1 to 8, including any servers or databases, may use any suitable number of subsystems to facilitate the functions described herein.

Figure 9:
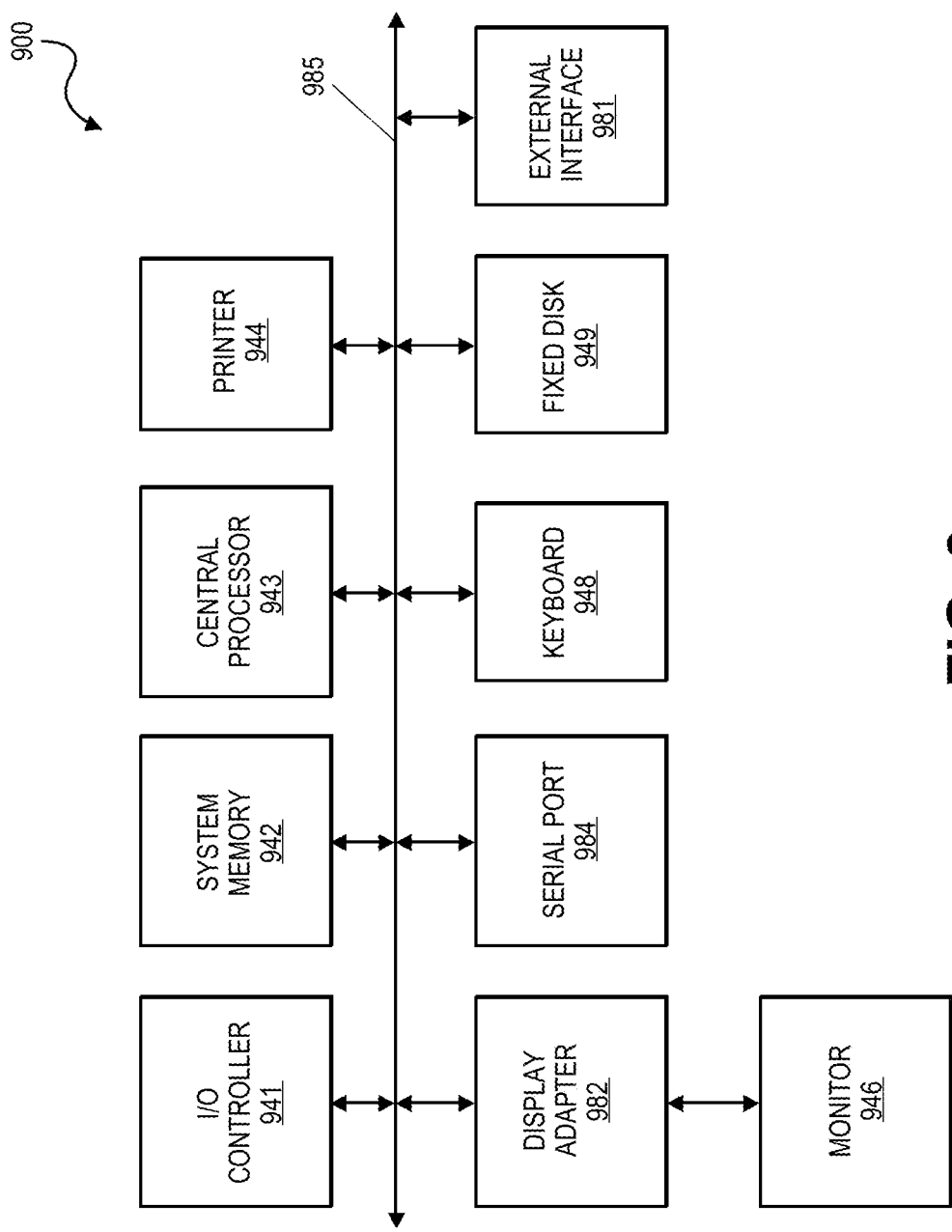
FIG. 9 illustrates a block diagram of an exemplary computer apparatus which can be used in embodiments of the invention.

Examples of such subsystems or components are shown by the block diagram 900 in FIG. 9. The subsystems shown in FIG. 9 are interconnected via a system bus 985. Additional subsystems such as a printer 944, keyboard 948, fixed disk 949 (or other memory comprising computer readable media), monitor 946, which is coupled to display adapter 982, and others are shown. Peripherals and input/output (I/O) devices, which couple to I/O controller 941 (which can be a processor or other suitable controller), can be connected to the computer system by any number of means known in the art, such as serial port 984. For example, serial port 984 or external interface 981 can be used to connect the computer apparatus to a wide area network such as the Internet, a mouse input device, or a scanner. The interconnection via system bus allows the central processor 943 to communicate with each subsystem and to control the execution of instructions from system memory 942 or the fixed disk 949, as well as the exchange of information between subsystems. The system memory 942 and/or the fixed disk 949 may embody a computer readable medium.

Figure 10:
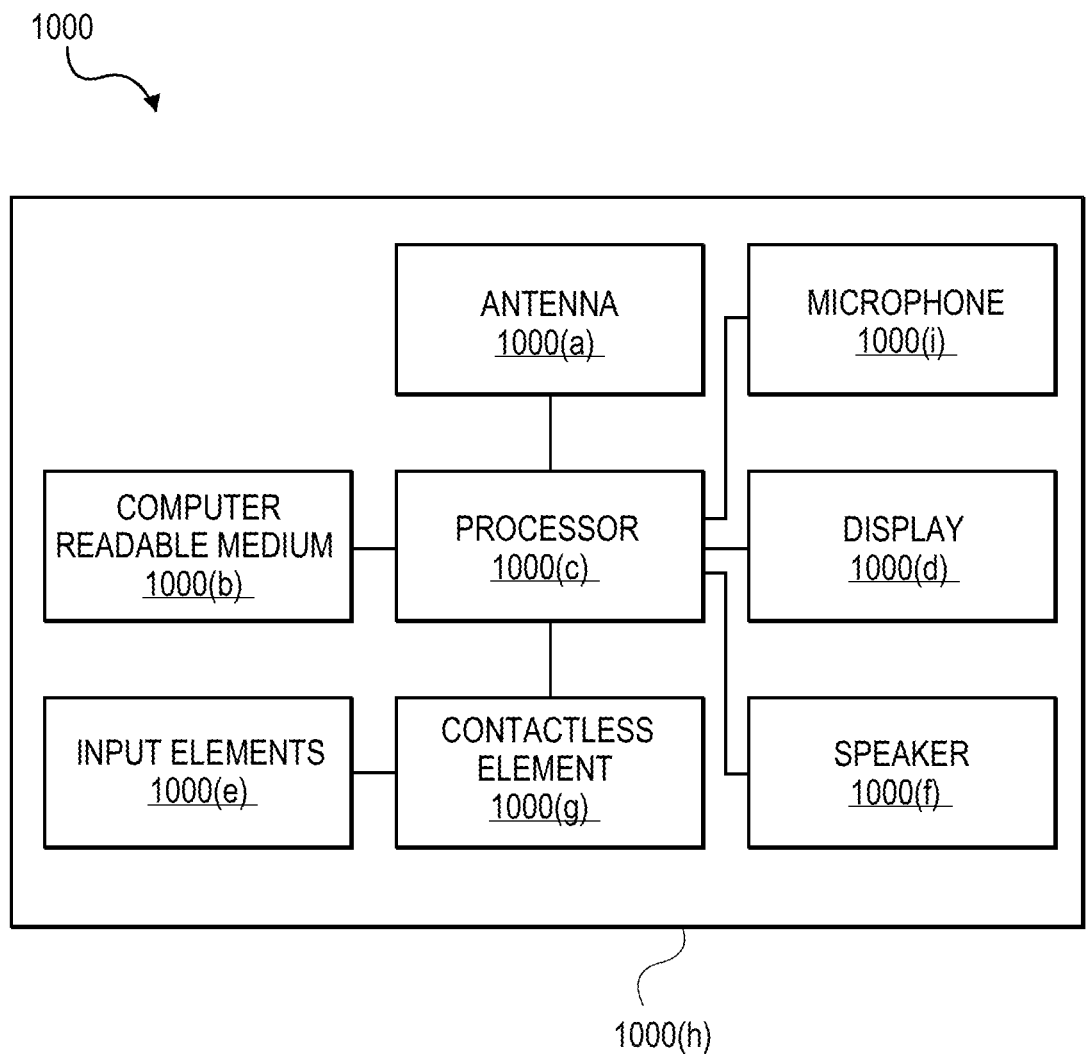
FIG. 10 illustrates a block diagram of an exemplary mobile device which can be used in embodiments of the invention.

With reference to FIG. 10, a block diagram of an exemplary mobile device 1000 is shown that may be used in some embodiments. In some embodiments, the mobile device 1000 may be a notification device that can receive alert messages, a payment device that can be used to make payments, an access device (e.g. POS device) that may receive information from a user to conduct a transaction, and/or a multi-purpose general use device. The exemplary mobile device 1000 may comprise a computer readable medium 1000(b) that may be present within the body (or outer casing) 1000 (h), or the computer readable medium 1000 (b) could be detachable from the device (e.g. the computer readable medium 1000 (b) could comprise an external memory that could be connected through a physical interface such as a USB connection, or the data could be hosted remotely and accessed wirelessly by the device—e.g. the data could be hosted and stored at a remoter server in the "cloud"). The computer readable medium 1000 (b) may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 1000 (such as to an access device), via any suitable method, including the use of antenna 1000 (a) or contactless element 1000 (g). The body 1000 (h) may be in the form a plastic substrate, housing, or other structure.

In some embodiments, the mobile device 1000 may further include a contactless element 1000g), which is typically implemented in the form of a semiconductor chip (or other data storage element) with an associated wireless transfer (e.g., data transmission) element, such as an antenna. Contactless element 1000 (g) may be coupled to (e.g., embedded within) the mobile device 1000 and data or control instructions that are transmitted via a cellular network may be applied to the contactless element 1000 (g) by means of a contactless element interface (not shown). The contactless element interface functions to permit the exchange of data and/or control instructions between the mobile device circuitry and an optional contactless element 1000 (g), or between another device having a contactless element (e.g. a POS terminal or a payment device). Contactless element 1000 (g) may be capable of transferring and receiving data using a short range wireless communication capability. As noted above, mobile device 1000 may comprise components to both be the interrogator device (e.g. receiving data) and the interrogated device (e.g. sending data). Thus, the mobile device 1000 may be capable of communicating and transferring data or control instructions via both cellular network (or any other suitable wireless network—e.g. the Internet or other data network) and short range communications.

The mobile device 1000 may also include a processor 1000 (c) (e.g., a microprocessor) for processing the functions of the phone 1000 and a display 1000 (d) to allow a user to see phone numbers and other information and messages. The mobile device 1000 may further include input elements 1000 (e) to allow a user to input information into the device, a speaker 1000 (f) to allow the user to hear voice communication, music, etc., and a microphone 1000 (i) to allow the user to transmit her voice through the mobile device 1000. The mobile device 1000 may also include an antenna 1000 (a) for wireless data transfer (e.g., data transmission).

Embodiments of the invention are not limited to specific transaction initiation methods, such as magnetic stripe reading, chip card reading, secure mobile NFC payment, manual PAN key entry, or the like. In some embodiments, a transaction initiation mode indicator field may be used to indicate the transaction initiation method. In some embodiments, one or more of the entities involved in the transaction authorization process may identify a transaction initiation mode or channel used to transact. For example, an indicator identifying such a mode or channel may be included in authorization and clearing messages associated with the payment processing network.

The payment processing network may be capable of identifying transactions initiated from a secure element on a mobile device. For example, a secure element initiation mode may be defined to indicate that the payment credentials were obtained from a secure element on a mobile device and that CVV (Card Verification Value) or iCVV checking is possible. In another example, a contactless POS entry initiation mode may be defined to indicate that the payment credentials were obtained from a contactless chip, and that the transaction was processed in accordance with magnetic stripe data rules. It may further include an indication that online CAM (Card Authentication Method), dynamic CVV, iCVV or CVV checking is possible.

In some embodiments, digital wallet enabled transactions carried out without a mobile device may be identified to indicate, for example, that the transaction was initiated by a user using a digital wallet at a POS terminal. In some embodiments, the authorization or clearing messages identify a terminal type used, for example, a POS terminal not capable of reading a magnetic stripe, or not capable of reading a chip on a payment card.

In some embodiments, a business ID (BID) may be generated for each digital wallet provider per country. A database record may be created to associate each of the BIDs for the same digital wallet provider with that digital wallet provider. In some embodiments, a unique agent ID for a Payment Service Provider (PSP) or a Payment Facilitator (PF) may be assigned to each digital wallet provider. A PSP may be an entity internal to an organization (e.g., a payment processing network) that can contract with an acquirer for the purpose of providing acceptance to a merchant. A PF may be an entity external to an organization (e.g., a payment processing network) that can contract with an acquirer for the purpose of providing acceptance to a merchant. A merchant or a seller can contract with a PSP to obtain payment service.

In some embodiments, the unique agent ID may be assigned to indicate that the transaction came from a PSP and it may, for example, be included in the authorization and clearing and settlement message of a transaction wherein a PSP is providing the payment services to a merchant. The same unique agent ID may be assigned globally for each digital wallet provider, or a unique agent ID may be assigned per country as described with reference to BIDs above. The same entity may be providing digital wallet and the PSP services, as well as other services (e.g., a rewards provider or token requestor). The unique agent ID may be compatible across these different functions. The unique agent ID may, in some embodiments, be the same identifier as the provider-specific digital wallet identifier. In order to identify the digital wallet provider and the PSP, a combination of a digital wallet identifier and a further identifier may be used, or a different identifier may be assigned to each entity for each of the different functions it performs for a particular transaction. In one embodiment, different field locations may be used for each type of service described above. In some cases, the same entity may provide digital wallet and PSP services as well as some other services (e.g., rewards provider, token requestor, etc.).

BIDs and unique agent IDs may be included in any of the communications in which digital wallet identifiers are included. In some embodiments, transactions without the presence of a digital wallet identifier, a BID and/or a unique ID may be monitored for compliance, for example, by the payment processing network.

In some embodiments, a server computer may include a processor or processing elements configured to execute instructions or code in order to implement methods, processes or operations. A computer readable medium (CRM) may comprise code, executable by the processor, for implementing methods using embodiments of the invention. The server computer may be associated with the merchant, acquirer, payment processing network, digital wallet provider or the issuer and may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those of ordinary skill in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
receiving, by a computer system, an authorization request message including payment credentials comprising a digital wallet identifier for a transaction, a primary account number or a payment token, and a data field comprising an indicator that indicates that the digital wallet identifier is present in the authorization request message, wherein the indicator is used to indicate to at least the computer system that the digital wallet identifier is present in the authorization request message and can be extracted from the authorization request message, wherein the digital wallet identifier includes a string of values that comprise a provider-specific digital wallet identifier uniquely identifying that a digital wallet is associated with a first digital wallet provider and a user-specific digital wallet identifier identifying that the digital wallet is associated with a first user, and wherein the authorization request message is generated by an access device associated with a merchant based at least in part on payment credentials obtained from a communication device of a user, at least some of the obtained payment credentials being obtained from a trusted execution environment associated with the communication device;
detecting, by the computer system, the indicator in the data field of the payment credentials;
responsive to the detecting of the indicator, extracting, by the computer system, the digital wallet identifier from the payment credentials;
performing, by the computer system using a corresponding wallet identifier module, further processing based at least in part on the extracted digital wallet identifier, wherein the further processing comprises:
identifying the transaction as a digital wallet transaction based on the extracted digital wallet identifier;
determining to request an additional security factor from the first digital wallet provider based at least in part on the extracted digital wallet identifier and an identification that the first digital wallet provider is a separate entity from a second digital wallet provider associated with the computer system, the additional security factor including multi-factor security authentication;
performing a fraud analysis for the first user by identifying transactions associated with the digital wallet identified by the user-specific digital wallet identifier facilitated by the first digital wallet provider identified by the provider-specific digital wallet identifier and the first digital wallet provider, and the additional security factor; and generating a risk profile for the user using the identified transactions associated with the digital wallet identified by the user-specific digital wallet identifier.

2. The method of claim 1, wherein the further processing comprises determining the transaction is fraudulent using the digital wallet identifier.

3. The method of claim 1, wherein the further processing comprises facilitating the transaction using the digital wallet identifier.

4. The method of claim 1, wherein the digital wallet identifier comprises the user-specific digital wallet identifier, and the further processing comprises facilitating the transaction using the digital wallet identified by the user-specific digital wallet identifier.

5. The method of claim 1, wherein the further processing comprises facilitating the transaction using the first digital wallet provider identified by the provider-specific digital wallet identifier.

6. The method of claim 1, wherein the computer system comprises a payment processing network computer system of a payment processing network or an issuer computer system of an issuer.

7. The method of claim 1, wherein the communication device is a mobile device, and wherein the trusted execution environment is provided by a secure element on the mobile device.

8. The method of claim 1, wherein the trusted execution environment is provided by a cloud storage.

9. The method of claim 1, wherein the payment credentials comprise the payment token.

10. The method of claim 1, wherein the authorization request message is formatted so as to include two separate instances of the digital wallet identifier, a first instance of the digital wallet identifier being included in issuer application data for extraction by a payment processing network computer system or an issuer computer system, and a second instance of the digital wallet identifier being provided for extraction by a merchant computer system or an acquirer computer system.

11. A computer system, comprising:
one or more processors;
a memory storing computer-executable instructions that, when executed with the one or more processors, cause the computer system to, at least:
receive an authorization request message including payment credentials comprising a digital wallet identifier for a transaction, a primary account number or a payment token, and a data field comprising an indicator that indicates that the digital wallet identifier is present in the authorization request message, wherein the indicator is used to indicate to at least the computer system that the digital wallet identifier is present in the authorization request message and can be extracted from the authorization request message, wherein the digital wallet identifier includes a string of values that comprise a provider-specific digital wallet identifier uniquely identifying that a digital wallet is associated with a first digital wallet provider and a user-specific digital wallet identifier identifying that the digital wallet is associated with a first user, and wherein the authorization request message is generated by an access device associated with a merchant based at least in part on payment credentials obtained from a communication device of a user, at least some of the obtained payment credentials being obtained from a trusted execution environment associated with the communication device;
detect the indicator in the data field of the payment credentials;
responsive to the detecting of the indicator, extract the digital wallet identifier from the payment credentials;
perform, using a corresponding wallet identifier module of the computer system, further processing based at least in part on the extracted digital wallet identifier, wherein the further processing comprises:
identifying the transaction as a digital wallet transaction based on the extracted digital wallet identifier;
determining to request an additional security factor from the first digital wallet provider based at least in part on the extracted digital wallet identifier and an identification that the first digital wallet provider is a separate entity from a second digital wallet provider associated with the computer system, the additional security factor including multi-factor security authentication;
performing a fraud analysis for the first user by identifying transactions associated by the digital wallet identified by the user-specific digital wallet identifier facilitated by the first digital wallet provider identified by the provider-specific digital wallet identifier; and
generating a risk profile for the user using the identified transactions associated with the digital wallet identified by the user-specific digital wallet identifier.

12. The computer system of claim 11, wherein the further processing comprises determining the transaction is fraudulent using the digital wallet identifier.

13. The computer system of claim 11, wherein the further processing comprises facilitating the transaction using a digital wallet identified by the user-specific digital wallet identifier.

14. The computer system of claim 11, wherein the further processing comprises facilitating the transaction using a digital wallet provider identified by the provider-specific digital wallet identifier.

15. One or more computer-readable media collectively having thereon computer-executable instructions that, when executed with a computer system, causes the computer system to, at least:
receive an authorization request message including payment credentials comprising a digital wallet identifier for a transaction, a primary account number or a payment token, and a data field comprising an indicator that indicates that the digital wallet identifier is present in the authorization request message, wherein the indicator is used to indicate to at least the computer system that the digital wallet identifier is present in the authorization request message and can be extracted from the authorization request message, wherein the digital wallet identifier includes a string of values that comprise a provider-specific digital wallet identifier uniquely identifying that the digital wallet is associated with a first digital wallet provider and a user-specific digital wallet identifier identifying that a digital wallet is associated with a first user, and wherein the authorization request message is generated by an access device associated with a merchant based at least in part on payment credentials obtained from a communication device of a user, at least some of the obtained payment credentials being obtained from a trusted execution environment associated with the communication device;

detect the indicator in the data field of the payment credentials;

responsive to the detecting of the indicator, extract the digital wallet identifier from the payment credentials;

perform, using a corresponding wallet identifier module of the computer system, further processing based at least in part on the extracted digital wallet identifier, wherein the further processing comprises:

identifying the transaction as a digital wallet transaction based on the extracted digital wallet identifier;

determining to request an additional security factor from the first digital wallet provider based at least in part on the extracted digital wallet identifier and an identification that the first digital wallet provider is a separate entity from a second digital wallet provider associated with the computer system, the additional security factor including multi-factor security authentication;

performing a fraud analysis for the first user by identifying transactions associated by the digital wallet identified by the user-specific digital wallet identifier facilitated by the first digital wallet provider identified by the provider-specific digital wallet identifier, and the additional security factor; and generating a risk profile for the user using the identified transactions associated with the digital wallet identified by the user-specific digital wallet identifier.

16. The one or more computer-readable media of claim 15, wherein the further processing comprises determining the transaction is fraudulent using the digital wallet identifier.

17. The one or more computer-readable media of claim 15, wherein the further processing comprises facilitating the transaction using the digital wallet identifier.

* * * * *